(12) United States Patent
Fleischmann

(10) Patent No.: US 8,875,119 B2
(45) Date of Patent: Oct. 28, 2014

(54) SYSTEM AND METHOD FOR GENERATING A SOURCE CODE FOR A COMPUTER PROGRAM

(75) Inventor: Albert Fleischmann, Pfaffenhofen (DE)

(73) Assignee: Metasonic GmbH, Pfaffenhofen (DE)

( * ) Notice: Subject to any disclaimer, the term of this patent is extended or adjusted under 35 U.S.C. 154(b) by 54 days.

(21) Appl. No.: 13/349,725

(22) Filed: Jan. 13, 2012

(65) Prior Publication Data

US 2012/0221999 A1 Aug. 30, 2012

(30) Foreign Application Priority Data

Jan. 17, 2011 (DE) .......................... 10 2011 000 185

(51) Int. Cl.
*G06F 9/445* (2006.01)
*G06F 9/44* (2006.01)
*G06F 17/30* (2006.01)
*G06F 12/00* (2006.01)

(52) U.S. Cl.
CPC ... *G06F 8/34* (2013.01); *G06F 8/35* (2013.01)
USPC ........... 717/170; 717/104; 707/737; 707/609; 709/206

(58) Field of Classification Search
CPC ............... G06F 8/10; G06F 8/20; G06F 8/30; G06F 8/34; G06F 8/36
USPC ................................................. 717/106–109
See application file for complete search history.

(56) References Cited

U.S. PATENT DOCUMENTS

| | | | |
|---|---|---|---|
| 5,524,253 A | 6/1996 | Pham et al. | |
| 5,625,580 A | 4/1997 | Read et al. | |
| 6,167,435 A * | 12/2000 | Druckenmiller et al. | 709/206 |
| 6,546,416 B1 * | 4/2003 | Kirsch | 709/206 |
| 6,594,693 B1 * | 7/2003 | Borwankar | 709/219 |
| 7,861,221 B2 | 12/2010 | Fleischmann et al. | |
| 7,882,146 B2 * | 2/2011 | Tomic et al. | 707/803 |
| 8,000,328 B1 * | 8/2011 | Kandekar et al. | 370/392 |

(Continued)

FOREIGN PATENT DOCUMENTS

| | | |
|---|---|---|
| DE | 10008632 B4 | 2/2004 |
| WO | 98/39698 | 9/1998 |

OTHER PUBLICATIONS

Ossher, et al., "Subject-Oriented Programming: Supporting Decentralized Development of Objects", 7th IMB Conference on Object-Oriented Technology, Jul. 1994, pp. 1-13.

(Continued)

*Primary Examiner* — Don Wong
*Assistant Examiner* — Mohammad Kabir
(74) *Attorney, Agent, or Firm* — Rankin, Hill & Clark LLP

(57) ABSTRACT

The present invention relates to system and a method for the generation of a source code for a computer program for the execution and/or simulation of a process from a process description, in particular graphical, independent of the source code. The system comprises a process generator and a source code generator. The process generator is so designed that clusters with several subjects are generated automatically, while all possible message exchanges between the subjects are generated at the same time as subjects are generated. The process generator provides functions for the deletion of individual automatically messages and a function for the generation of individual messages between one of the subjects of the cluster and a subject which is not part of this cluster.

14 Claims, 22 Drawing Sheets

(56) References Cited

U.S. PATENT DOCUMENTS

Figure 1:
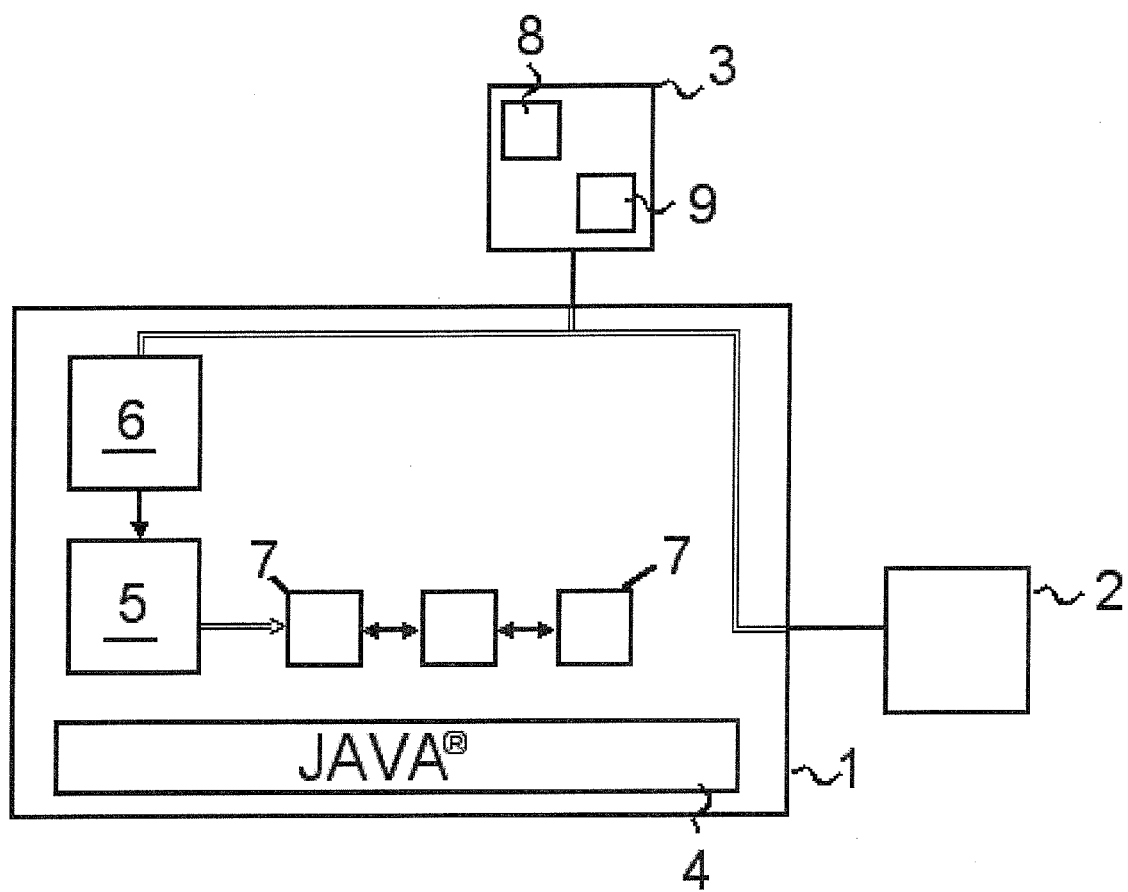

| | | | |
|---|---|---|---|
| 8,386,487 B1* | 2/2013 | Ben-Artzi et al. | 707/737 |
| 2002/0035607 A1* | 3/2002 | Checkoway et al. | 709/206 |
| 2002/0095525 A1* | 7/2002 | Fables et al. | 709/318 |
| 2002/0103866 A1* | 8/2002 | Chi et al. | 709/206 |
| 2002/0133494 A1* | 9/2002 | Goedken | 707/10 |
| 2002/0186245 A1 | 12/2002 | Chandhoke et al. | |
| 2003/0177190 A1* | 9/2003 | Moody et al. | 709/206 |
| 2004/0107414 A1 | 6/2004 | Bronicki et al. | |
| 2005/0005261 A1* | 1/2005 | Severin | 717/108 |
| 2005/0057584 A1* | 3/2005 | Gruen et al. | 345/752 |
| 2005/0229154 A1* | 10/2005 | Hiew et al. | 717/110 |
| 2008/0127120 A1* | 5/2008 | Kosche et al. | 717/131 |
| 2008/0177994 A1* | 7/2008 | Mayer | 713/2 |
| 2008/0244372 A1* | 10/2008 | Rohall et al. | 715/200 |
| 2009/0100405 A1* | 4/2009 | Belenky et al. | 717/104 |
| 2010/0088195 A1* | 4/2010 | Bellamy et al. | 705/27 |
| 2010/0241244 A1* | 9/2010 | Bliss et al. | 700/18 |
| 2011/0125851 A1* | 5/2011 | McErlean | 709/206 |
| 2012/0005667 A1* | 1/2012 | DeLuca et al. | 717/170 |
| 2012/0198017 A1* | 8/2012 | LeVasseur et al. | 709/206 |

OTHER PUBLICATIONS

Summary of "Presseinformation: jPass! macht Prozesse lebendig, Mar. 8, 2004", one page.

Fleischmann, "Distributed Systems Software Design and Implementation", Springer-Verlag, pp. 263-292.

Summary of DE 10008632 B4, two pages.

Fleischmann, et al., "Experience Processes, Before Spending Money", dated-Jan. 5, 2004, 34 pages.

Chun Ouyang, Wil M.P. van der Aalst, Marlon Dumas, and Arthur H.M. ter Hofstede, Translating BPMN to BPELM, 22 pages.

William Harrison and Harold Ossher, "Subject-Oriented Programming (A Critique of Pure Objects)", Oct. 28, 1993, pp. 411-428, No. 10, ACM Sigplan Notices, New York.

* cited by examiner

SYSTEM AND METHOD FOR GENERATING A SOURCE CODE FOR A COMPUTER PROGRAM

The present invention relates to a system and a method for the generation of a source code for a computer program for the execution and/or simulation of a process in which several subjects communicate with one another.

A method for the generation of a source code for a computer program for the execution and/or simulation of a complex process in which several subjects communicate with one another is disclosed by U.S. Pat. No. 7,861,221. In this method the processes are described, the description of the processes is stored in a process file, and with the aid of the process file a source code for a computer program is generated, with a separate source code file being created for each subject.

Through the provision of a source code file for each subject, a complex process may be divided easily and therefore automatically into several sub-programs, the source code files, which may be generated automatically. By this means it is possible to produce automatically a computer program for a very complex process.

A further benefit of this known method lies in the fact that, after automatic generation, it may be executed immediately, i.e. directly after generation it may be validated by execution.

The invention is based on the problem of so developing such a system and/or such a method for the generation of a source code for a computer program for the execution and/or simulation of a process, from a process description independent of the source code, that the preparation of the process description of a complex process and therefore the generation of the source code is significantly easier, faster and more error-free to carry out.

The problem is solved by a system with the feature of claim 1 and by a method with the feature of claim 6. Advantageous developments are set out in the respective dependent claims.

The system according to the invention for the generation of a source code for a computer program for the execution and/or simulation of a process from a process description, in particular graphical, independent of the source code, comprises a process generator to generate the process description and a process file, and a source code generator for the automatic generation of a source code from the process file. The process generator has a process manager which is provided with the following functions to describe a process:

- a function for the generation of a cluster with a predetermined number of subjects, wherein this function is so designed that in each case two messages are generated automatically between all pairs of subjects, wherein each subject sends one of the two messages of the respective pair of messages and receives the other message.
- a function for the deletion of individual automatically generated messages.
- a function for the generation of individual messages between one of the subjects of the specific cluster and a subject which is not part of this one specific cluster.
- a function for the storage of the process description containing the cluster or clusters in a process file, wherein the process description is converted automatically into a meta language in which it is stored in the process file, wherein subjects are defined in the meta language, and the subjects contain commands for the sending and/or receiving of messages.

With the function for generating a cluster with a predetermined number of subjects, presetting the number of subjects in itself generates a process description which has a corresponding number of subjects and messages, in which two messages are exchanged between each pair of subjects, with each subject receiving and/or sending one of the two messages. In this way a cluster with a predetermined number of subjects and all possible messages between the subjects is generated automatically.

With the other functions, individual messages between the subjects of the cluster may be deleted and other messages generated on subjects outside the cluster.

The automatically generated process description of a cluster represents firstly a universal process with a predetermined number of subjects and all theoretically possible communication links.

By deleting individual messages, the universal process may be converted into a special process. This reduction of the universal process to a special process through deletion of individual messages is described as restriction.

The inventors of the present invention have recognised that, in the simulation of certain processes, specific groups of subjects generally solve a specific task together, in which case almost all subjects then communicate with one another. The inventors have therefore provided a system which automatically creates suitable clusters of subjects for such subjects working together on a problem, while at the same time all possible messages between the subjects are generated. As a rule, only a few messages are deleted in order to represent correctly the process for solution of a specific problem within a cluster. The automatic generation of the subjects and all messages between the subjects therefore effects a considerable simplification and acceleration in the generation of the relevant process description. This process description is preferably generated in a meta language which defines the individual subjects, while the subjects contain commands for the sending and receiving of messages. Preferably this process description is represented graphically in the form of a block diagram on an output device (process diagram), so that a user deals only with the graphical process description and does not see the process description in the meta language.

A further benefit of the automatic generation of the cluster with all possible messages is that all possible messages are automatically available and no communication link between two specific subjects can be forgotten. The generation of the process description is therefore much more reliable and may also be carried out safely by persons with limited experience in the preparation of such process diagrams. If there is one message too many in the cluster, the result is that it is not executed, without this interfering in the sequence of the process. If on the other hand a message were missing, then the process could not be executed. This system is therefore very much more robust against errors by the user.

The process generator comprises preferably a process manager and a subject manager, and in particular a workflow manager.

The process manager serves to generate the process description (process diagram), which is in particular graphical, and the subject manager serves to change the behaviour of individual subjects.

The process generator is preferably a software module, wherein the process manager is a graphical user interface (GUI) of the process generator to display and process a process diagram with several subjects, and the subject manager is a graphical user interface (GUI) to display and process individual subjects.

The workflow manager is a further user interface of the process generator, which is not necessarily a graphical user interface. The workflow manager is so designed that it guides the user along consecutive states of the individual subjects, so that the user may change the behaviour of the relevant subject through input.

The process manager has preferably one or more of the following functions:
- a function for changing the name of the individual messages, wherein during the execution of this function the changed name of the message is entered automatically into the relevant commands of the subjects for processing the message, in particular the sending and receiving commands.
- a function for changing the name of a subject, wherein during the execution of this function the changed name of the subject is entered automatically into the relevant commands of the subjects which are referenced to this subject.
- a function to determine which subject is the first to send a message,
- a function to determine the sequence of sending the individual messages wherein in individual subjects a branching of message flows may be determined on the basis of a decision with relevant conditions.

The subject manager has preferably one or more of the following functions:
- a function for restricting the content of a message to be received,
- a function for restricting the number of potential senders of a message to be received,
- a function for repeating certain commands,
- function for the integration of a refinement in a subject,
- a function for the output of data at an output device,
- a function for the input of data at an input device,
- a function for the execution of a decision dependent on predetermined parameters,
- a function for the termination of the process sequence.

Using these functions a user may easily and quickly determine the message flow between the individual subjects in the preferably graphical process description, while by means of the subject manager he can change the behaviour of individual subjects. In particular it is possible with the subject manager to integrate refinements in a subject, i.e. to retrieve existing programs or program packages through a subject, to bring to execution, and to take over the result in the form of data, which may then be used further in a command of the subject. For example it is possible to use this result as the basic parameter of a decision for a branching of the message flow, or to include it in the content of a message.

Using the system according to the invention, complex processes may be simulated easily, with separate clusters being generated for individual problems to be solved within a complex process. These individual clusters are linked to one another by means of messages between the subjects contained in the respective clusters. The modulation of a complex process is very simple, since the individual clusters may be generated independently of one another, may be tested independently of one another, and may then be linked simply by means of an exchange of messages. It has been found in practice that communication between the individual clusters takes place with significantly fewer message exchanges than within an individual cluster. It is therefore expedient to generate the messages individually between subjects of different clusters. This is also described as construction.

The present invention also relates to a method for the generation of a source code for a computer program for the execution or simulation of a process in which several subjects communicate with one another. The method comprises the following steps:

- generation of a process description, wherein at least one specific cluster is determined with a predetermined number of subjects, and at least one further subject is defined which may be an integral part of a further cluster
- automatic generation of in each case two messages between all pairs of subjects of the cluster, wherein each subject sends one of the two messages of the respective pair, and the other receives
- provision of a function to delete individual messages of the automatically generated messages
- provision of a function to generate individual messages between one of the subjects of the specific cluster and a subject which is not part of a specific cluster
- storage of the process description with the input definitions in a process file
- automatic generation of at least one source code file for a computer program, in each case containing commands for the exchange of data between the individual subjects.

Generation of the process description of a cluster is effected automatically, with only the number of subjects of the cluster being preset by the user. The method may also be used to generate several clusters, which are then linked by means of individual messages exchanged between the subjects of the respective clusters.

Preferably a separate source code file is generated for each cluster. By this means it is possible for different clusters to run on different computers, and communicate with one another over a LAN (Local Area Network) or a WAN (Wide Area Network), in particular the internet.

With the method according to the invention, in the simulation of the exchange, any desired objects may be simulated by the exchange of information. One aspect of this simulation system according to the invention is therefore to depict any exchange of information, goods, monetary values, etc. between the subjects on the "exchange of information" (=messages).

In the system and method according to the invention, the process description may be produced and stored in the form of meta language, separately from the process description contained in the process file. It is however also possible for only the process description to be stored in the process file in meta language form, and for the process generator to have a function which converts the process description in the meta language into another presentation more easily read by the user, in particular a graphical presentation in the form of a block diagram. The process description may however also exist in the form of a prose text which briefly describes the individual subjects and explains their behaviour. However a graphical presentation in the form of a process diagram is very much preferred, since it enables a complex process or a part of a complex process with all its subjects and messages to be shown simply and clearly.

By setting the sequence of the messages exchanged between individual subjects, the behaviour of the subjects receiving or sending the messages is defined, since the behaviour of a subject is determined substantially by when it receives a particular message and when it sends a particular message. The behaviour of subjects may also be made more precise by means of the subject manager or workflow manager, since further commands to execute an action (command: DO) or commands to execute a decision may be inserted between the commands to receive and send messages.

The system according to the invention for the generation of a source code for a computer program comprises preferably a computer with an output device and an input device, wherein the process generator and the source code generator are software modules stored and executable on the computer.

The source code generator and the process generator are preferably two independent software modules. They may however also be integrated into one software module. This applies in particular if the source code is executed using an interpreter. The interpreter may be so designed that it can execute the process description directly in the meta language, so that generation of the source code is effected directly by generation of the process description in the meta language. This source code is preferably stored and may be executed in separate files for the respective cluster. It is however also possible for the source code of several clusters to be stored in one file.

If using a compiler to convert the source code into a machine code which is executable on a predetermined computer, it is however expedient to provide a separate source code generator, which generates from the process description a source code which is readable by the compiler. The source code is then generated separately for each cluster in a manner similar to that known from U.S. Pat. No. 7,861,221, in order to generate a source code for an individual subject.

The present invention represents a further development of the subject of U.S. Pat. No. 7,861,221 and of DE 10 2005 018 864 A1. Reference is therefore made in full to the subject of these two documents.

Figure 2:
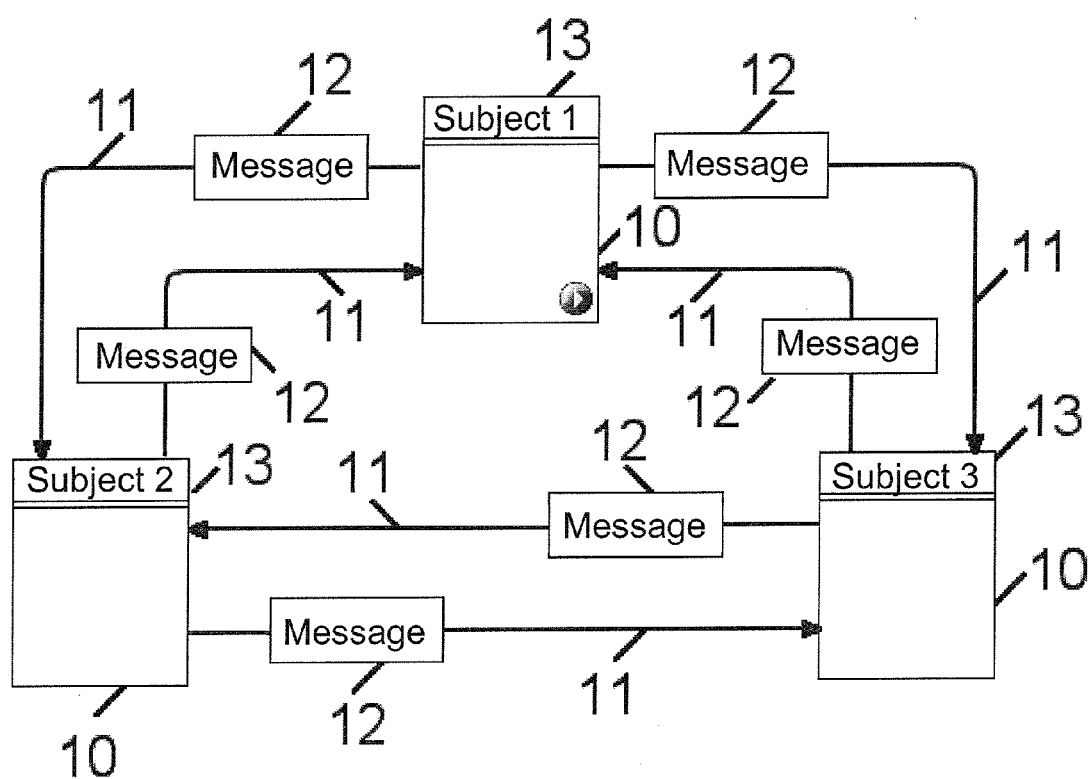
Figure 3:
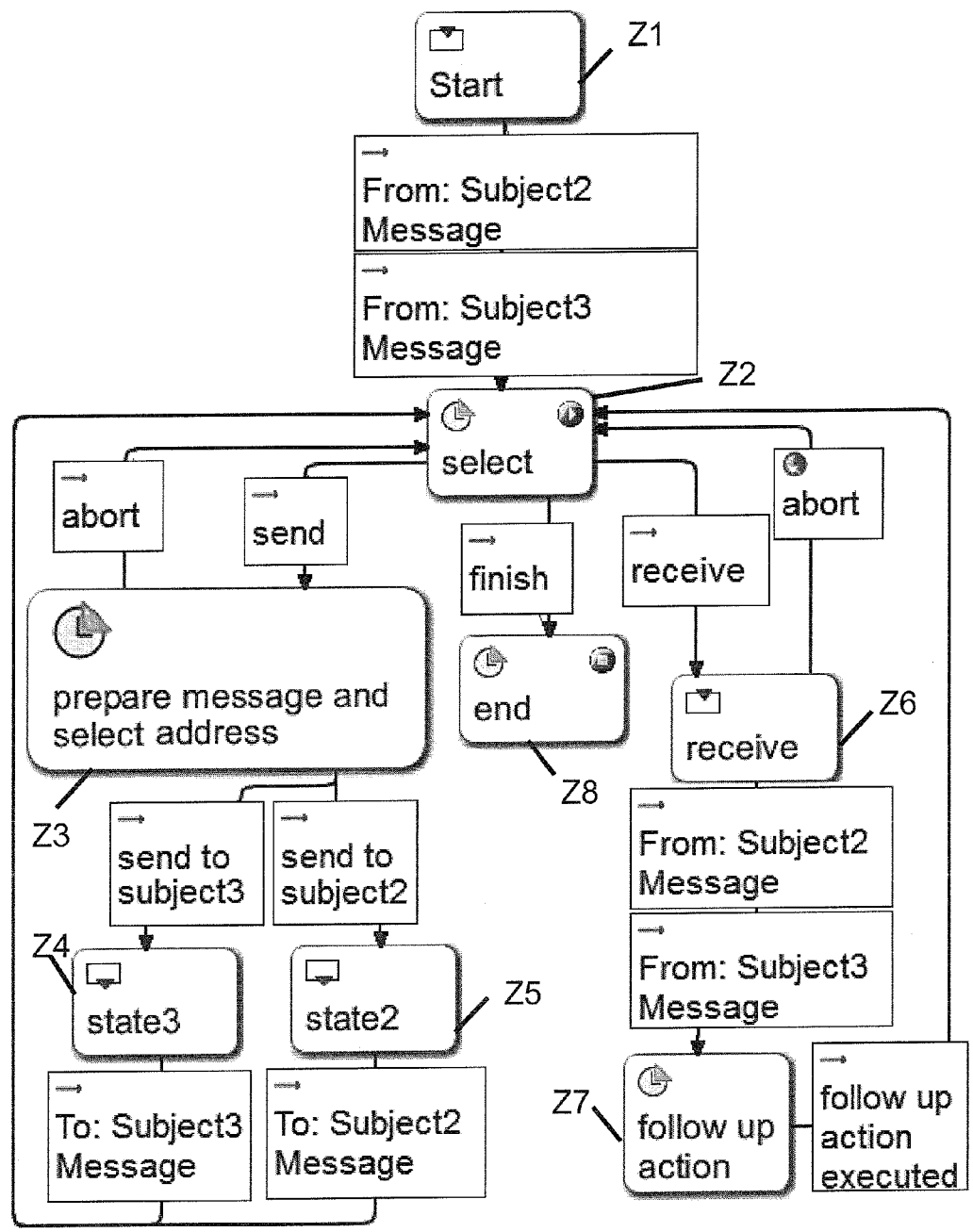
Figure 4:
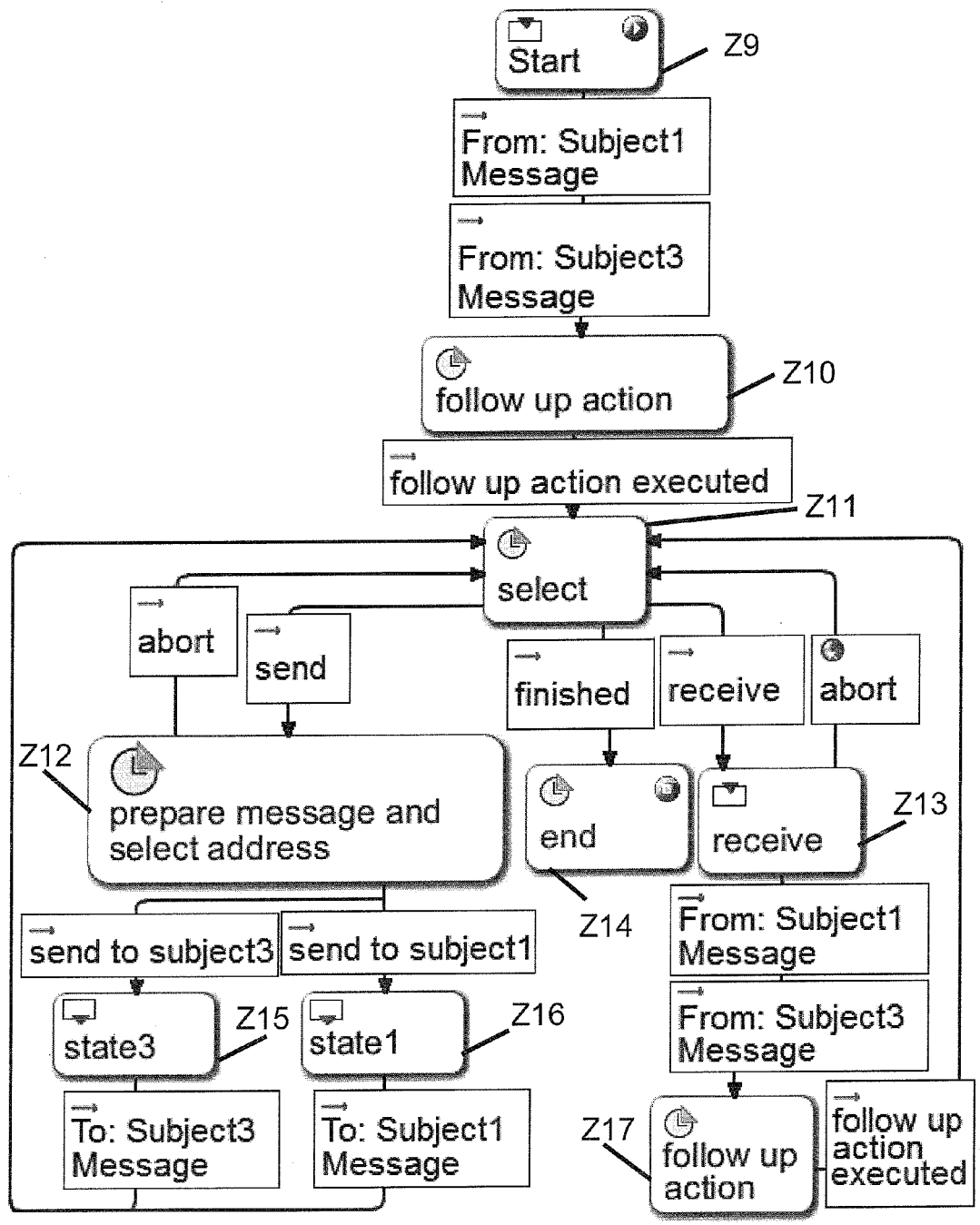
Figure 5:
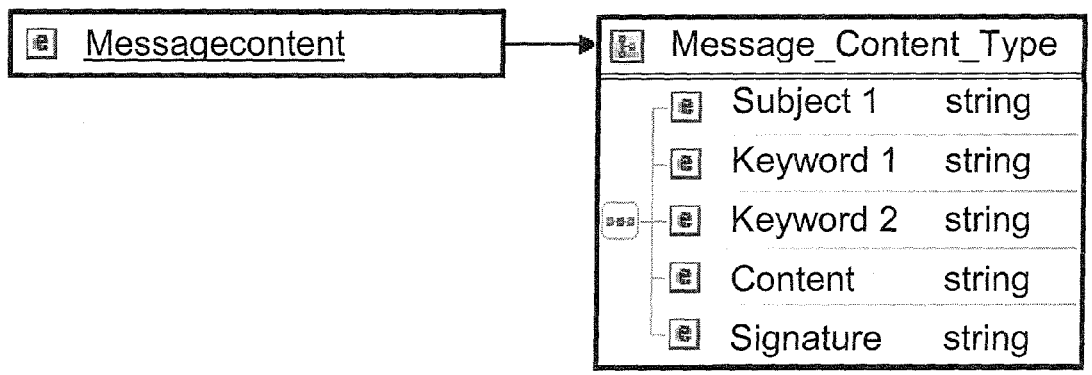
Figure 6:
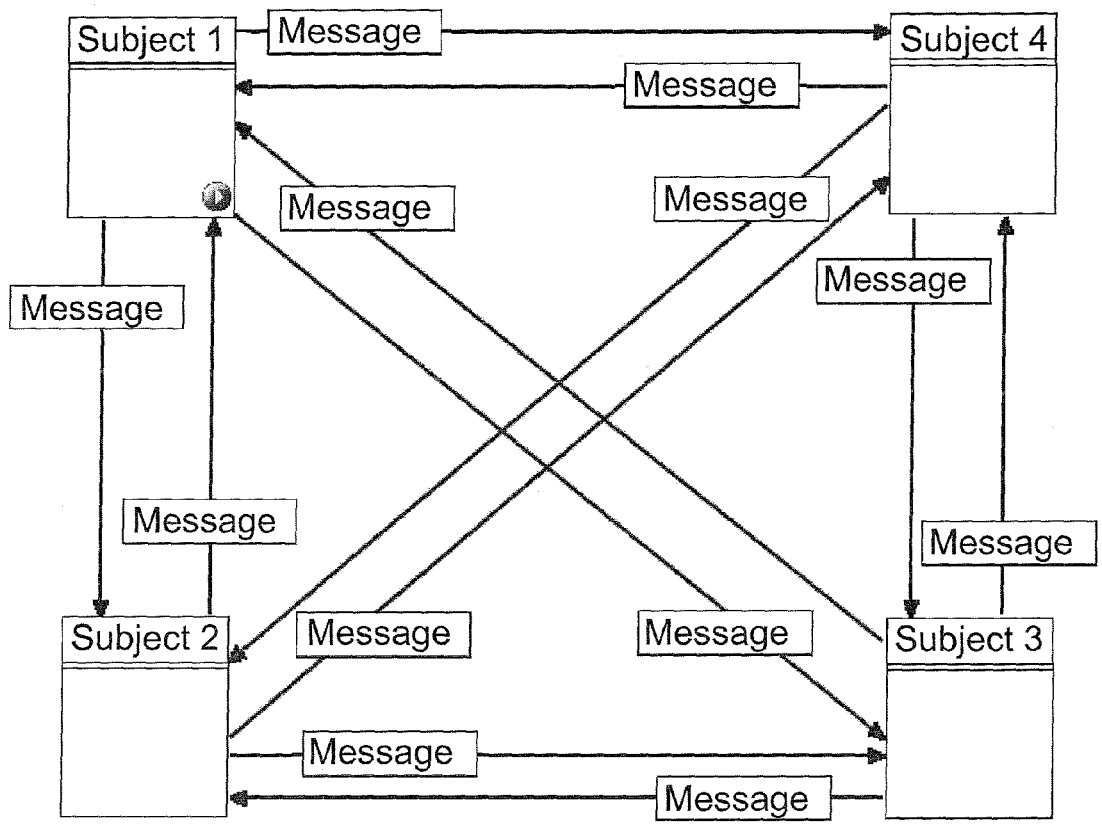
Figure 7:
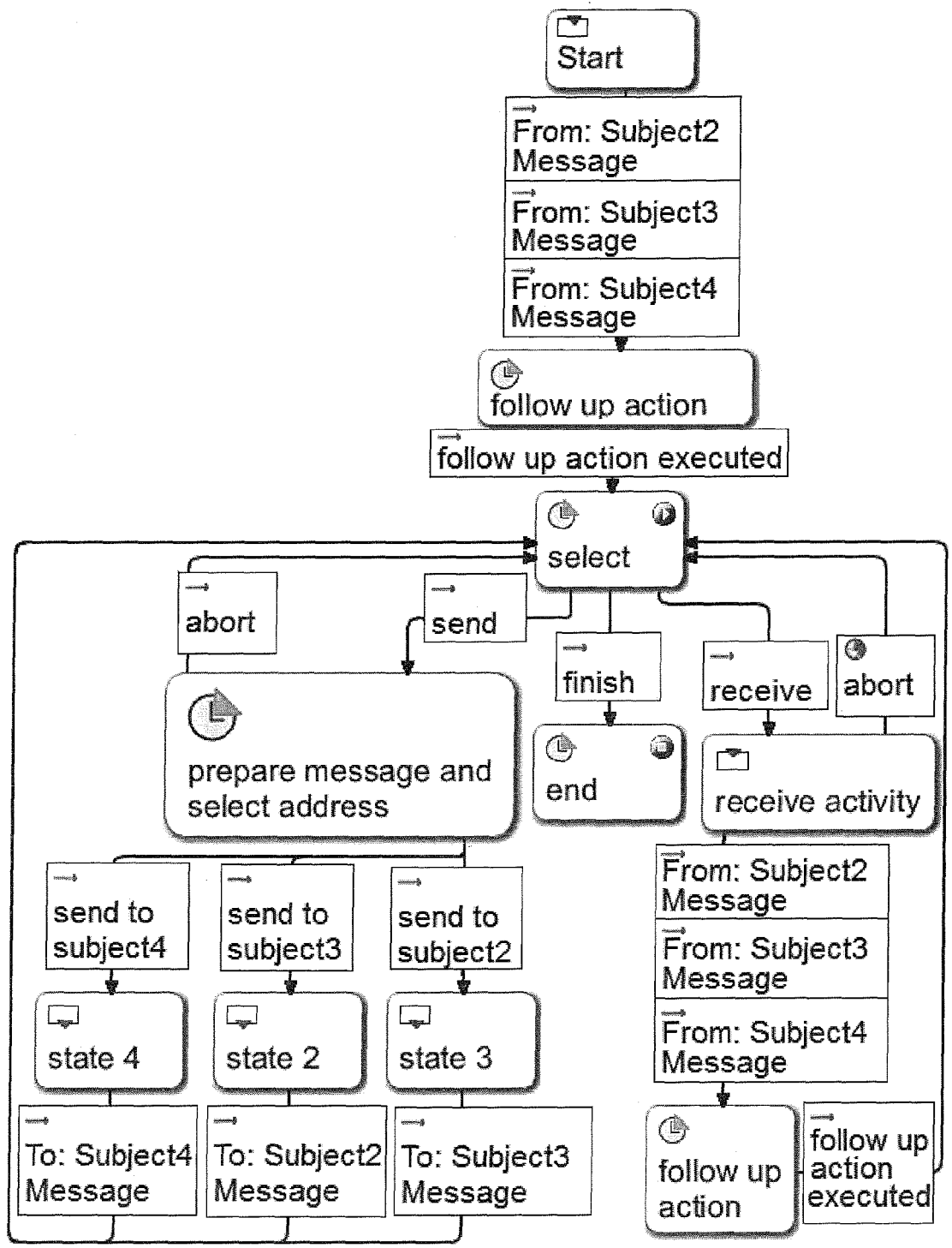
Figure 22:
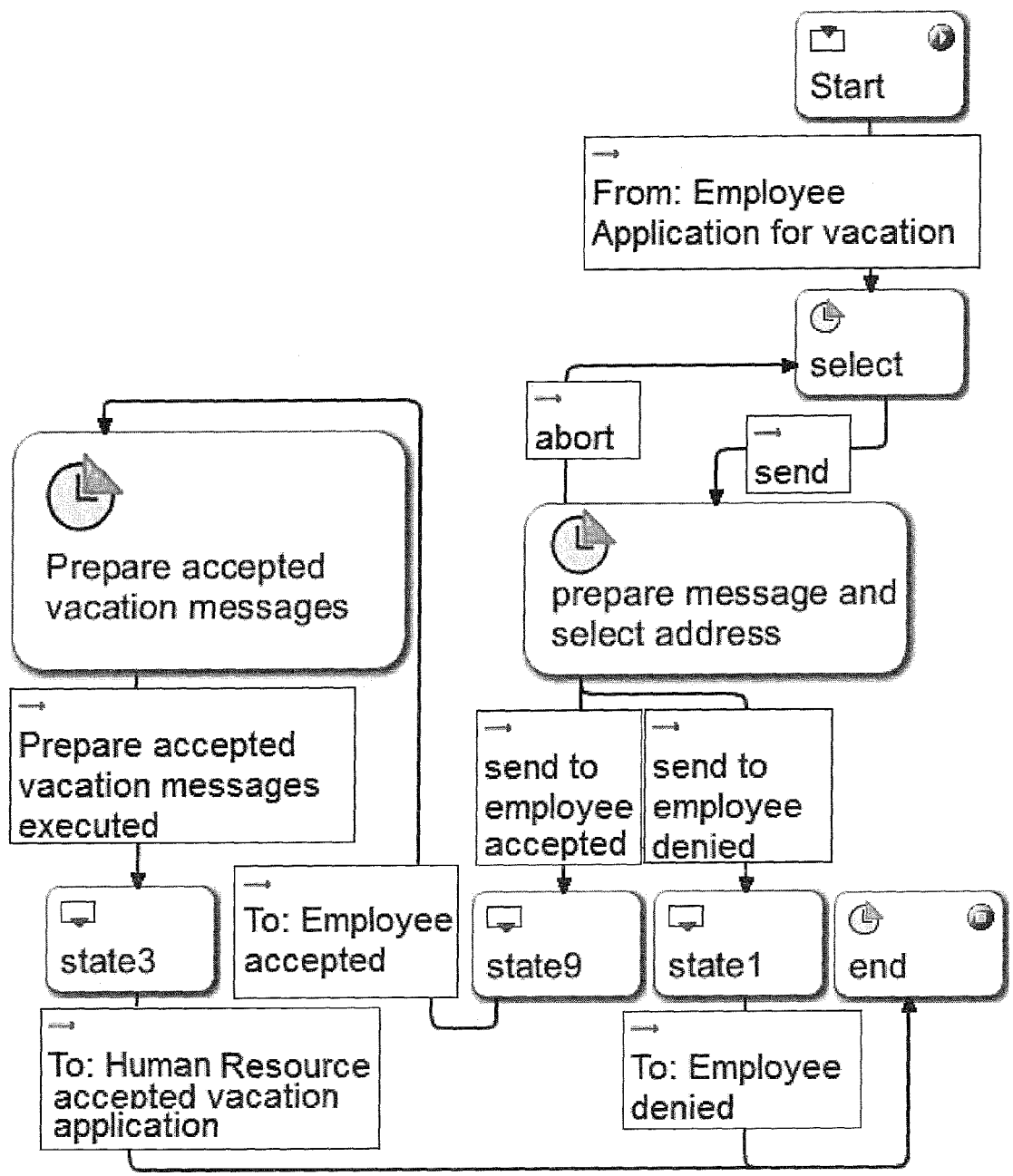
Figure 23:
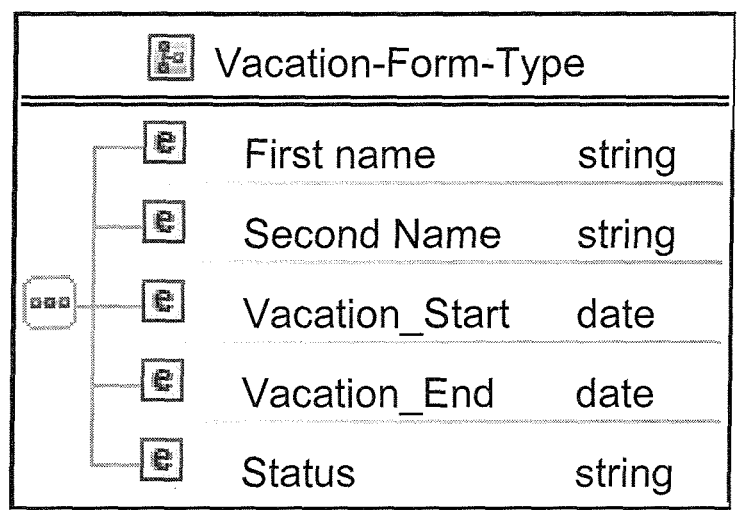

The invention is described below in detail with the aid of the drawings, which show in:

FIG. 1 schematically in a block diagram a system according to the invention for the generation of a source code for a computer program FIG. 2 a cluster with three subjects in a process diagram FIGS. 3 and 4 the behaviour of one subject in each case, in a state transition diagram FIG. 5 the structure of a message FIG. 6 a cluster with four subjects in a process diagram FIG. 7 the behaviour of a subject in a state transition diagram FIGS. 8 to 23 an example of modelling the process of application for vacation authorisation with process diagrams (FIG. 8, FIG. 12, FIG. 16, FIG. 18), with screen shots (FIG. 9, FIG. 10), a swimming lane diagram (FIG. 11) with state transition diagrams (FIGS. 13, 14, 15, 17, 19, 20, 21, 22) and the structure of a message (FIG. 23).

FIG. 1 shows in schematic form, in a block diagram, a system for the generation of a source code for a computer program for the execution and/or simulation of a process in which several subjects communicate with one another. The system comprises a computer system 1 which for the purpose of the present invention may be a single computer or a network and may be a multiplicity of computers. The computer system 1 has at least one input device 2, comprising a keyboard and a computer mouse, together with an output device 3. The output device is typically a monitor or a beamer. A JAVA platform 4 is provided in the computer system 1.

The system has a source code generator 5 and a process generator 6. The process generator is a computer program which is used to generate a process description and a process file. The source code generator is another computer program designed for the automatic generation of a source code 7 from the process file.

The process generator 6 has a process manager 8 and a subject manager 9. The process manager 8 is a graphical user interface, by which a process may be described. In the present embodiment, the process manager is designed to produce a graphical process diagram, in which the process is presented in the form of a block diagram (e.g. FIG. 2), in which the individual subjects 10 are shown as blocks and the messages between the subjects 10 are represented by arrows 11 which commence at a subject from which the message is sent, and finish at a subject which receives this message. Each of these arrows has a box 12 in which the name of the message is given. The blocks 10 in the process diagram which represent the subjects have a header 13, in which the name of the respective subject is given.

A complete process or a part of a process with several subjects may therefore be depicted and processed by the process manager 8.

The subject manager 9 is another graphical user interface of the process generator 6, which is designed to change the behaviour of the subject. Using the subject manager it is possible to change individual commands contained in the subject. The commands contained in a subject are shown by the subject manager. This may be effected for example in the form of a block diagram in which each command is represented by a block, and the individual blocks are linked by means of arrows, wherein the arrows represent messages exchanged between individual commands. The individual commands and messages may also be changed in the subject manager by means of text input, in which by clicking on a command or a message a corresponding input window opens, in which parameters, resources on which the commands draw, receivers of messages or any other restrictions may be input.

To describe a process the process manager has at least the following functions:

function for generating a cluster with a predetermined number of subjects, wherein this function is so designed that in each case two messages are automatically generated between all pairs of subjects of the cluster, wherein each subject sends one of the two messages of the respective pair and receives the other message function for deleting individual automatically generated messages function for the generation of individual messages between one of the subjects of the specific cluster and a subject which is not part of this specific cluster function for the storage of the process description containing the cluster or clusters in a process file, wherein the process description is converted automatically into a meta language, and the process file is stored in this meta language, wherein subjects are defined in the meta language, and the subjects contain commands for the sending and/or receiving of messages.

If the user calls up the function for generation of a cluster with a predetermined number of subjects, then the user is requested to enter the number of subjects. With this input, the process generator generates a complete cluster with the predetermined number of subjects, while also two messages are generated between each pair of subjects, wherein one message is sent from one of the two subjects to the other of the two subjects, and the other message is sent in the reverse direction. The subjects contain as default name the name "subject#", wherein "#" stands for the number of the subject. The individual subjects are automatically numbered consecutively with whole numbers from 1 to n (1, 2, . . . , n). The individual messages contain as default name the name "message". The cluster is shown in the process manager as a process diagram. FIG. 2 shows such a cluster with three subjects, and FIG. 6 shows such a cluster with four subjects.

As the number of subjects increases, the number of messages rises disproportionately to the number of subjects. With a cluster with five subjects, the number of all messages is twenty, whereas with ten subjects the number of all messages is already ninety.

The inventors of the present invention have recognised that, in the simulation of certain processes, certain groups of subjects as a rule solve a particular task together, in which case then generally almost all subjects communicate with one another. The number of subjects in such a group is relative small. Complex processes may therefore be sub-divided into sub-processes with just a few subjects, which according to the invention are represented as clusters.

The maximum number of subjects per cluster may be limited to a predetermined maximum value in the range of 5 to 15, and preferably in the range of 6 to 12.

With the invention, the subjects and all messages between the subjects are generated automatically, leading to considerable simplification and acceleration in the production of a suitable process description.

The process description is generated in a meta language, which defines the individual subjects, while the subjects contain commands for the sending and receiving of messages. In the present embodiment, the process manager 8 is designed so that it generates the graphical presentation of the process diagram from the process description executed in the meta language. The user sees only the graphically presented process diagram, in which he can further model the process. In particular he can delete individual automatically generated messages, wherein messages are deleted which are not needed for the processing of a specific problem. By this means, the complexity of the model is reduced step by step. Since all possible messages are preset, the user is unable to overlook any communication relationship in the modelling of a cluster. He must only judge whether the messages concerned are used in working through the process. This procedure is significantly much less prone to error and easier for a user who is inexperienced in the modelling of processes, than a system in which he has to construct the individual messages.

Preferably the process generator has a workflow manager, which guides the user in the processing of the individual messages. In this connection the workflow manager may have its own user interfaces and/or if required call up the process manager or the subject manager.

Firstly the user will be prompted by the workflow manager to specify one of the subjects which will be first to send a message. In FIGS. 2 and 6 this is in each case the subject 1, in each case marked by a white triangle 14. This is the first subject to send a message. The user is then prompted by the workflow manager to choose whether the message is sent first to subject 2 or subject 3. After the relevant choice has been made, the user is asked to replace the default name "message" of this selected message with a suitable name. On replacing this name, a new name is entered not only in the process diagram but also in the commands of the subjects which send and/or receive the message in the process description in the meta language. This is effected automatically, without being seen by the user. The user is then prompted by the process manager to specify which message will be transmitted by the subject which has received the first message. In this connection, branching of the message flow may be determined at the same time. Such branchings are decisions executed in the subject concerned. These decisions may be made on the basis of predetermined parameters read out from the message received or from other resources. The user is then prompted to give a suitable name to the message or messages sent by the subject concerned. The user is therefore guided step by step along the message flow wherein, in the case of branching, first one branch of the message flow is processed, and then the other. Messages which are not part of the message flow are deleted either before or after the renaming of the individual messages.

The complete potential behaviour of subject 1 is shown after generation of the cluster in FIG. 3 in a state transition diagram. Each subject may assume the states start, receive, prepare to send, send, finish and select. A start state (state Z1) is of virtually no significance in subject1, since subject 1 as start subject is identified in FIG. 2 and from the start is in the state "select" (state Z2). In the state "select", the subject may decide whether it wishes to receive or send the message. Since subject 1 is the start subject and must begin the process with the sending of a message, in this case the sending of a message must be executed. The select state therefore changes to the state "preparation of a message" and "select the address" (state Z3). From this state the subject 1 passes either into send state Z4 or send state Z5, by which a message is sent either to subject 3 or to subject 2. The state of subject 1 then reverts to select state Z2. In this, the subject decides whether it should receive or send messages. If it should receive messages, then it passes over to the receive state Z6. It remains in this state until it receives a relevant message from subject 2 or subject 3. On receiving this message, this subject 1 moves into the DO state Z7. In this DO state, subject 1 executes a specific action. The action may depend on the content of the message received. It may however also be independent of the message. The state of subject 1 then passes into the select state Z1, in which it decides whether it should receive or send messages or whether it should pass into the finish state. On transfer into the finish state Z8, the process for this subject 1 is ended.

FIG. 4 shows the state transition diagram of subject 2 immediately after generation of the cluster shown in FIG. 2. Subject 2 begins with a start state Z9 in which it first awaits the receipt of a message from subject 1 or subject 2. On receipt of the message, subject 2 transfers into a DO state Z10, in which it executes an action. The action may depend on the parameters contained in the message, or may also be executed independently thereof. After execution of this action, subject 2 moves into the select state Z11. In the select state Z11, subject 2 may decide whether to send a message, or whether to receive a message, or whether the process for subject 2 is ended. Depending on this decision, the state of subject 2 passes either into a prepare to send state Z12, a receive state Z13 or an end state Z14. In the prepare to send state Z12, a message is prepared and the receiving address selected. Depending on the receiving address, the state of subject 2 passes into the send state Z15 or the send state Z16, in which in each case one message is sent either to subject 3 or to subject 1.

If subject 2 is in the receive state Z13, it may receive a message from subject 1 or from subject 3. Depending on the content of the received message, or also irrespective of its content, the state of subject 2 moves after receiving a message into the DO state Z17, in which an action is executed. After sending the messages in states Z15 and Z16 or after executing the action in state Z17, the state of subject 2 reverts to the select state Z11, in which a fresh decision may be made as to whether to send a message, receive a message or terminate the process.

With the generation of the cluster, commands are automatically generated in the process description in the meta language in individual subjects, which lead to the transfers between individual states. These commands are basically "send", "receive" and "DO". There are only these three classes of command. The command "send" contains two process steps, namely the preparation of a message and selecting the address, and sending.

In the prepare to send state Z3 or Z12 and in the receive state Z6 or Z13, the process may also be aborted so that without complete execution of the relevant command, the state of the subject concerned reverts to the select state Z1 or Z11. This is especially the case when, within a predetermined interval of time, the desired message cannot be obtained, or if the necessary data to prepare a message are present.

FIG. 5 shows the structure of messages according to the present embodiment. In the present embodiment, message 5 contains data fields with the contents "subject 1", "keyword 1", "keyword 2", "content" and "signature". The type of these messages is in each case a string. The content of the messages may be varied. It is therefore possible to change the type of message. Alternative types are date, whole numbers, floating decimal point numbers, etc. The structure of the message and the name of the message may be changed by the user at the same time. With alteration to the structure of the message, suitable data fields are created automatically in the subjects sending or receiving the message, so as to be able to store the content of the message to be sent or received.

FIG. 6 shows the process diagram of a cluster with four subjects and FIG. 7 the state transition diagram of subject 1 of FIG. 6. This state transition diagram corresponds substantially to the state transition diagram of FIG. 3 wherein, because of the greater number of subjects, it must be possible to send the messages to more subjects or to receive the messages from more subjects respectively.

The modelling of a process is explained below with the aid of an example relating to requests for vacation authorisation within a company. Employees Max Mustermann, Tobias Heinzinger, Uwe Hoffman and Johannes Luther are entitled to vacations and may request them from their manager, whose name is Nils Meier. After approving the request, he must agree it with the person responsible for personnel matters in the company, Mrs. Elisabeth Schwarzmeier, so that she may record correctly the vacations granted.

Figure 8:
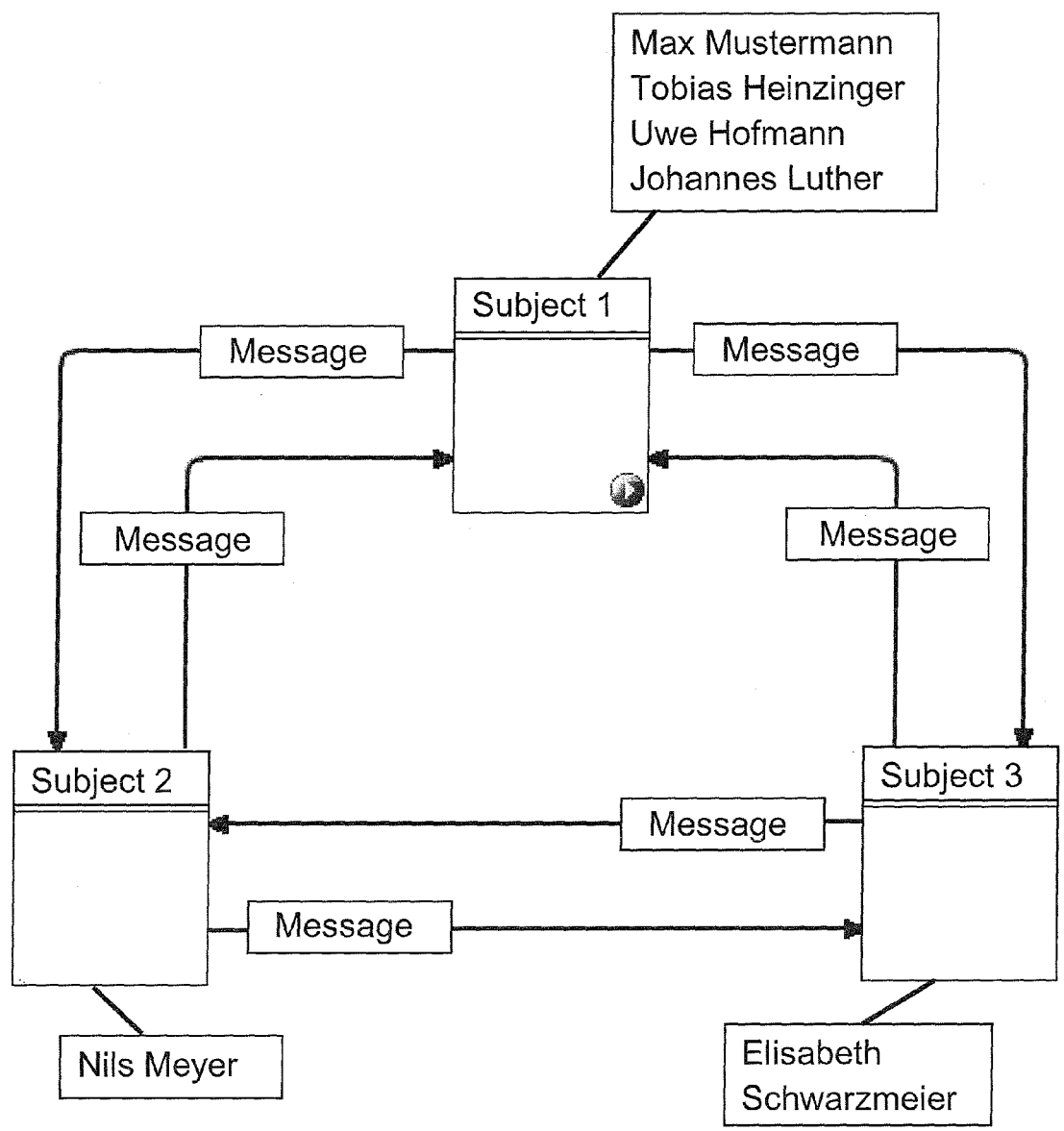
Figure 9:
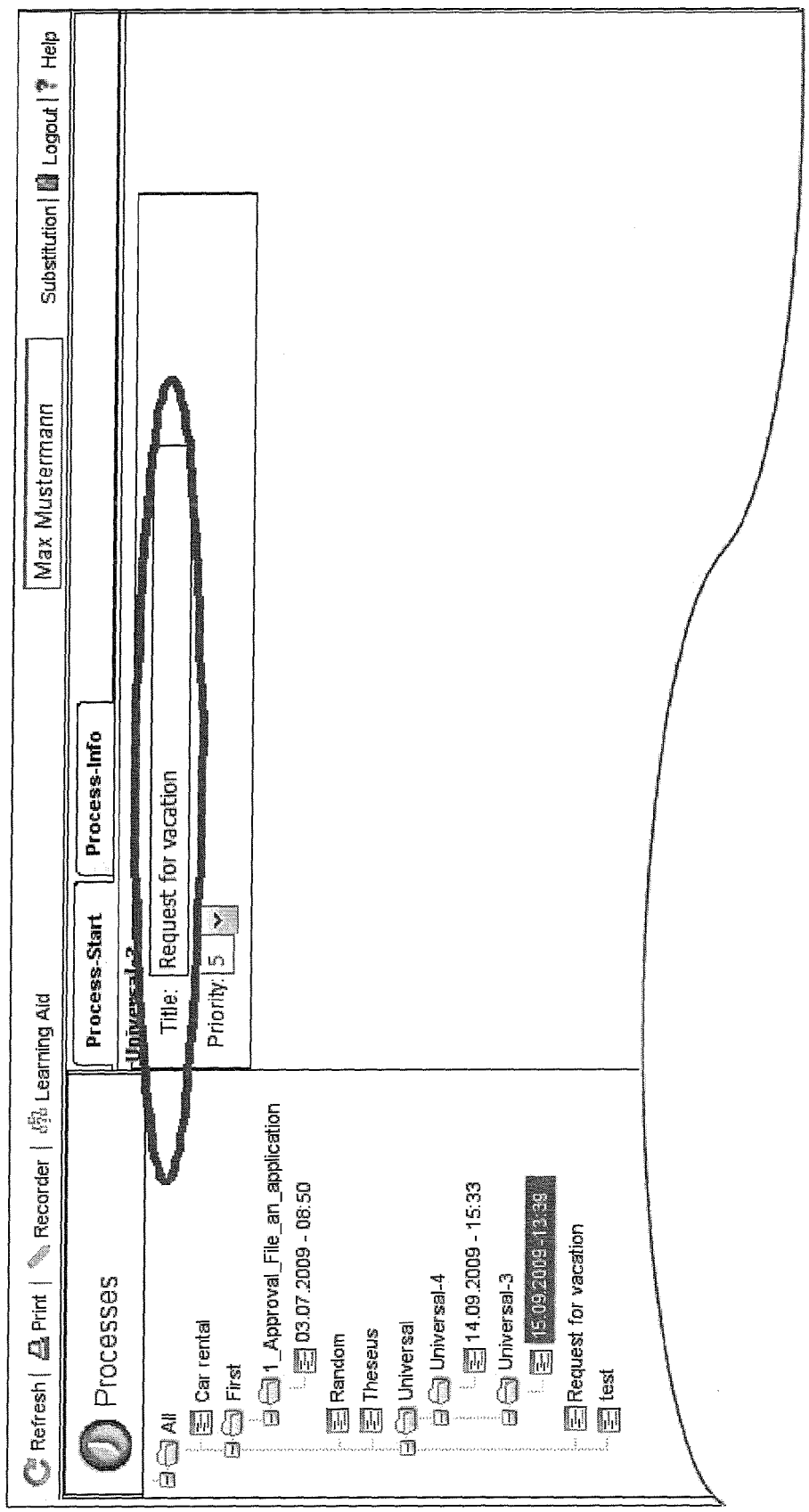

In principle a separate subject could be generated for each person. However a subject does not necessarily mean a specific person. A real person, a department, a group of people or even a machine or any other resource may be mapped on a subject, which may in a desired manner exchange a message, an object, an item of goods, monetary values or the like with someone else. In the present case it is therefore expedient to assign the group of employees a single subject. Since Mr. Nils Meier in his capacity as manager has to grant the vacation requests, he is assigned a further subject. Mrs. Elisabeth Schwarzmeier has to process a granted vacation request, and must execute this independently of Mr. Nils Meier, for which reason she is also assigned a separate subject. This request for vacation authorisation is therefore simulated by a cluster of three subjects (FIG. 8). The user of the system therefore creates first of all a cluster with three subjects, to which the system gives the default name "universal-3". Using the process manager and/or the workflow manager, he can assign this cluster the title "request for vacation" (FIG. 9).

Figure 10:
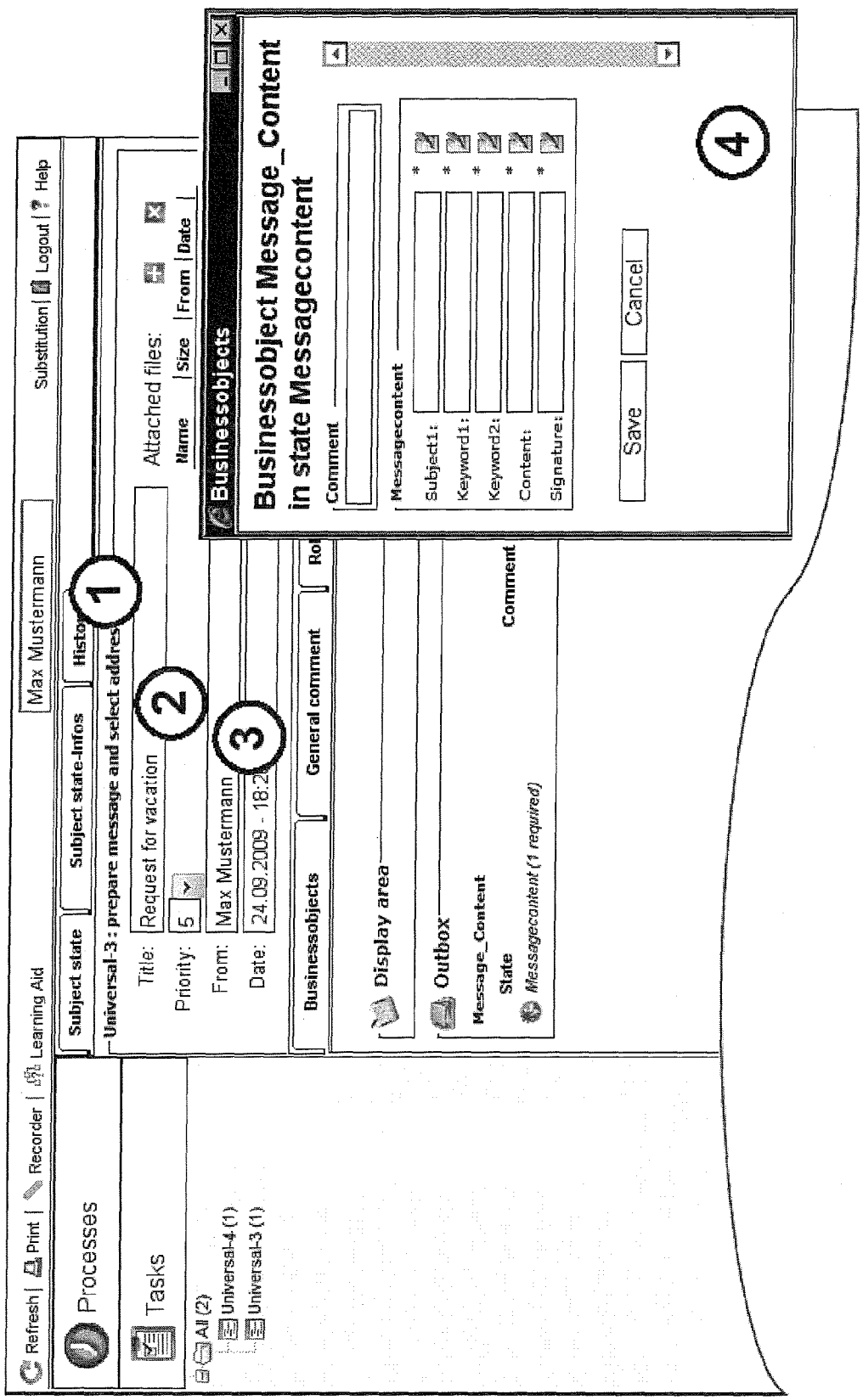
Figure 11:
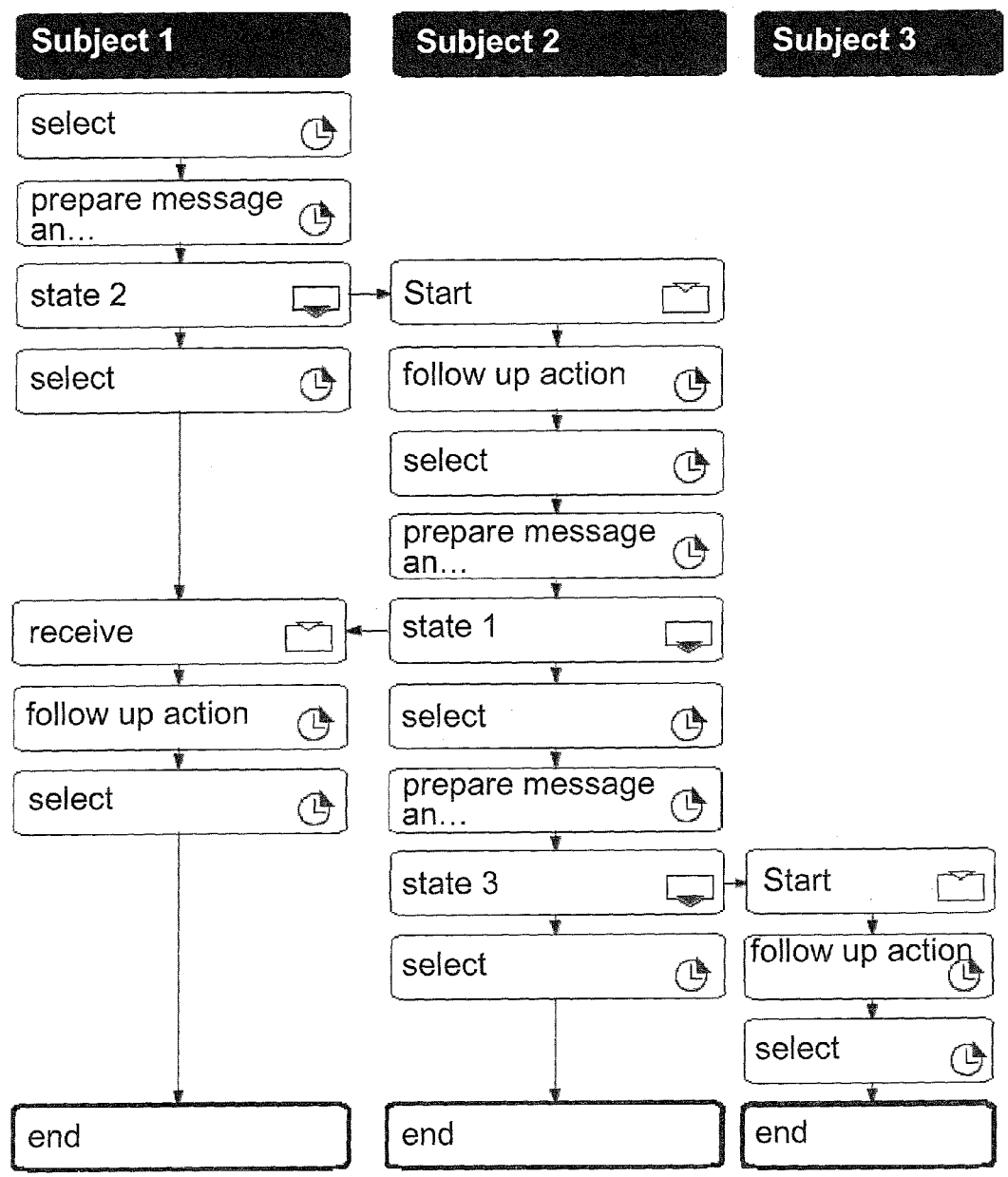

FIG. 10 shows the graphical user interface (GUI) of the workflow manager supporting the user, and which is part of the process manager. With this, the user is guided through the individual states, as described above with the aid of FIGS. 3 and 4, through the workflow according to the state transition diagrams (FIGS. 3, 4).

FIG. 10 shows at:

no. 1 the designation of the current state: "Prepare Message and Select Receiver"

no. 2 the designation of the cluster: "Request for Vacation"

no. 3 the user of the system in creating the cluster: "Max Mustermann" and the date of creation of the cluster: "24.09.2009-18:23".

no. 4 a form showing the message structure, which may be completed or modified by the user.

Also specified in the graphical user interface of the workflow manager is the designation of the subject, which is not visible in the screenshot shown in FIG. 10.

With the workflow manager, the user may define the messages to be sent or received by the individual states.

In addition to the workflow manager there is also the process manager, with which the user may directly delete messages in the process diagram, rename messages, rename subjects and specify a subject as start subject. The user is able to make changes both in the process manager and in the workflow manager, and is not bound to any sequence requiring him to deal with the process first in the process manager and then in the workflow manager, or vice-versa. He may also deal with the process alternately in the process manager and the workflow manager. The workflow manager can also as required call up the process manager and/or the subject manager.

Figure 12:
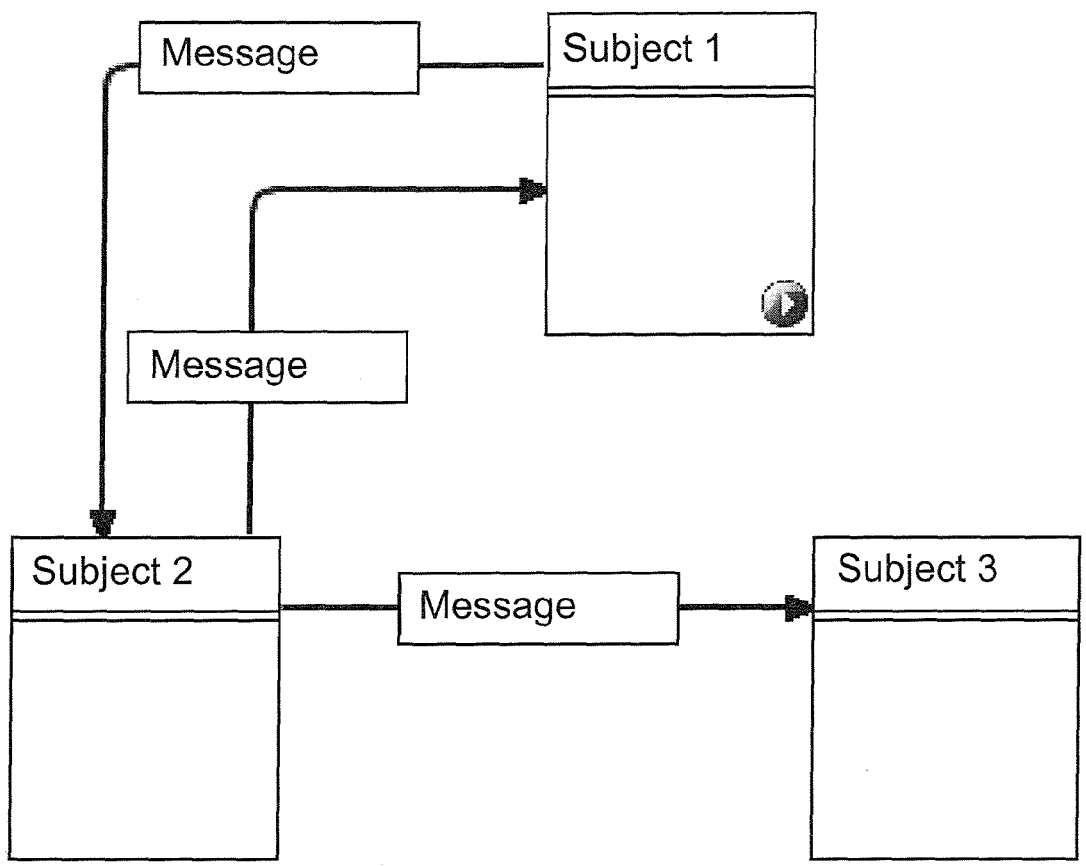
Figure 13:
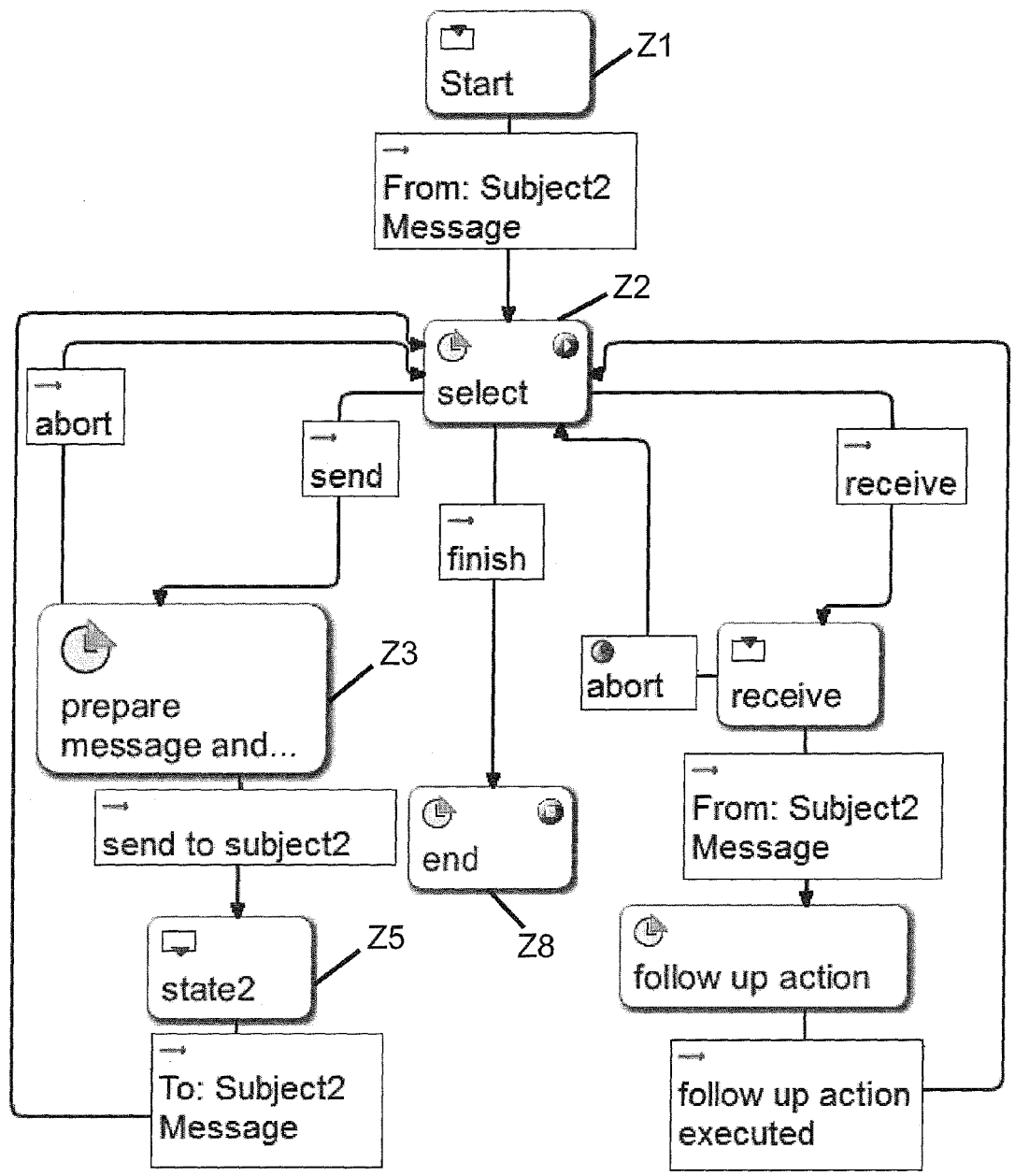

The user of the system knows that the employees have to request the vacation from their manager, and that the latter must inform human resources of approved vacation requests. It is therefore necessary to consider only communication relationships between the employees and the manager, and a message from the manager to human resources. Accordingly, the other messages in the process diagram may be deleted. A suitably revised process diagram is shown in FIG. 12. FIG. 13 shows the state transition diagram of subject 1 after deletion of the individual messages according to FIG. 12. This state transition diagram corresponds substantially to the state transition diagram of FIG. 3, for which reason the same states have been given the same reference numbers. State Z4 however is missing, since subject 1 is designed to send a message to subject 3, and the receive state Z6 is designed only to receive messages from subject 2 and not from subject 3.

Figure 14:
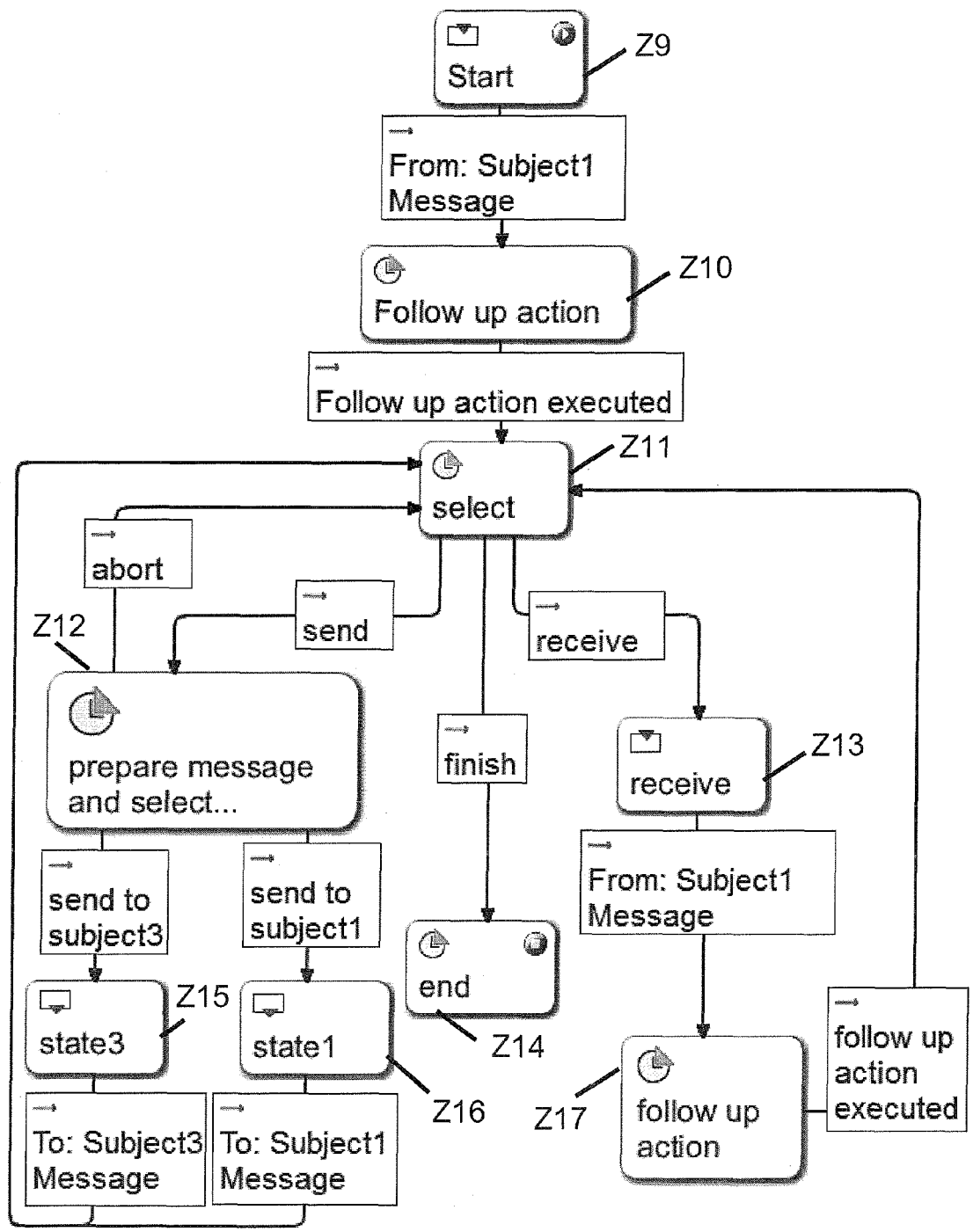

FIG. 14 shows the state transition diagram of subject 2, which corresponds substantially to the state transition diagram of FIG. 4, for which reason the same states have been given the same reference numbers.

State Z10 is missing. State Z13 is designed to receive a message only from subject 1, but not from subject 2.

Figure 15:
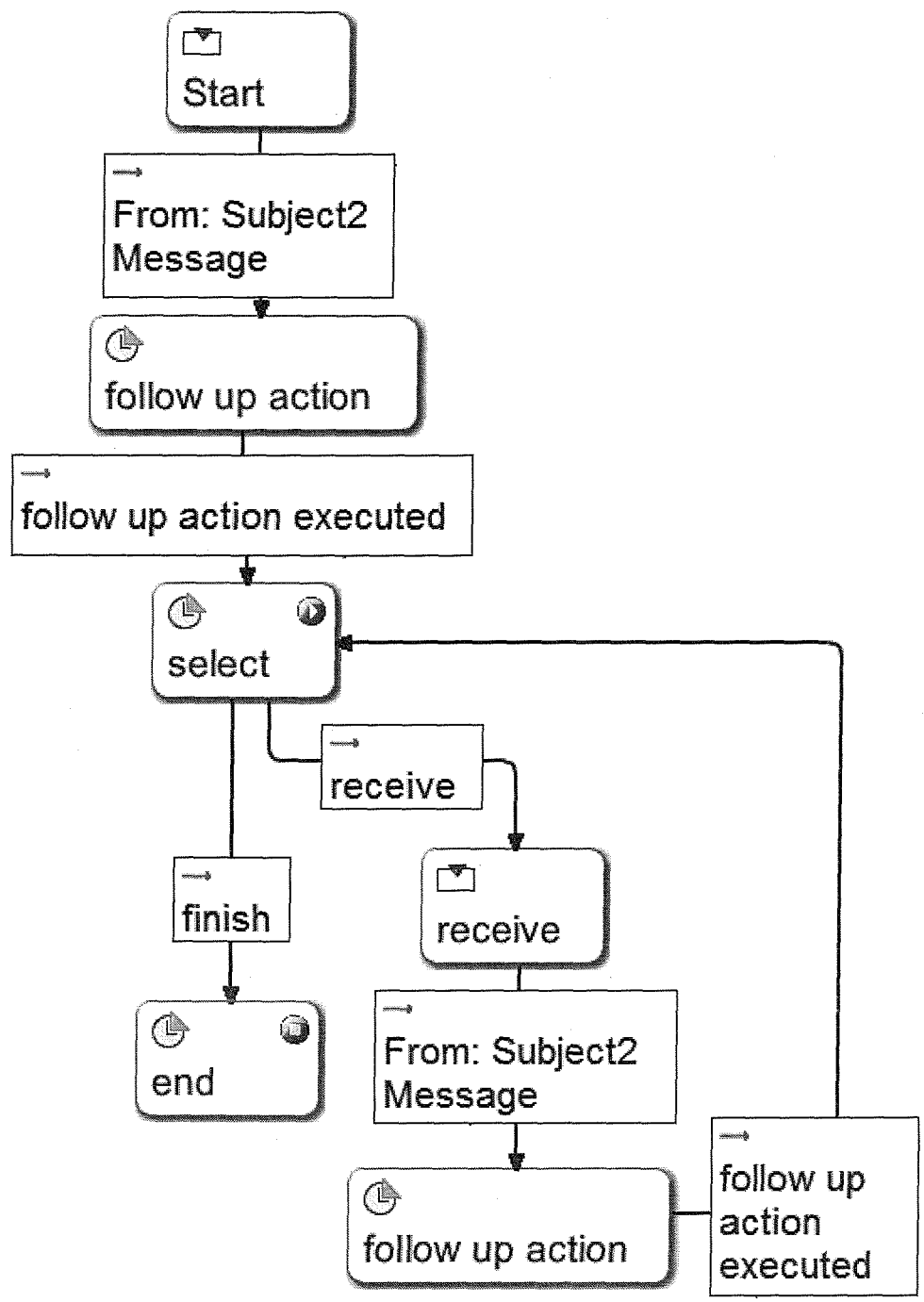
Figure 16:
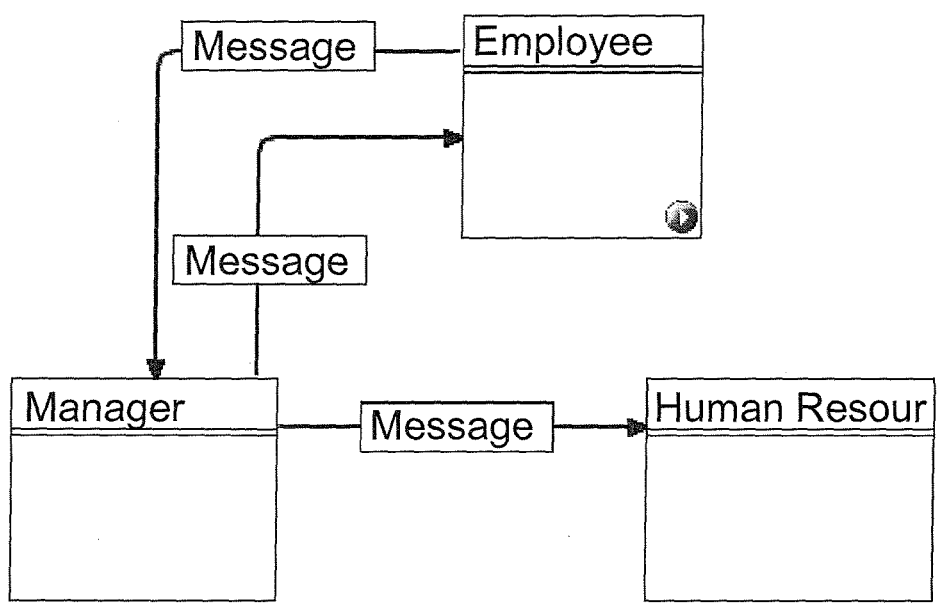

FIG. 15 shows the state transition diagram of subject 3, which is designed to receive a message only from subject 2.

The deletion of individual messages therefore changes the behaviour of the individual subjects. Through the deletion of the messages in the process diagram, the corresponding commands are deleted or specified in the description of the process in the meta language, so that they for example may only receive message from a specific subject or from a specific limited group of subjects. Here, the deletion of individual message links means not only the deletion of these message links in the process diagram, but also the changing of the commands in the subjects in the process description in the meta language.

In the process manager, the user may replace the default names of the subjects by meaningful names. In the present embodiment he has replaced "subject 1" by "employee", "subject 2" by "manager" and "subject 3" by "human resources".

Figure 17:
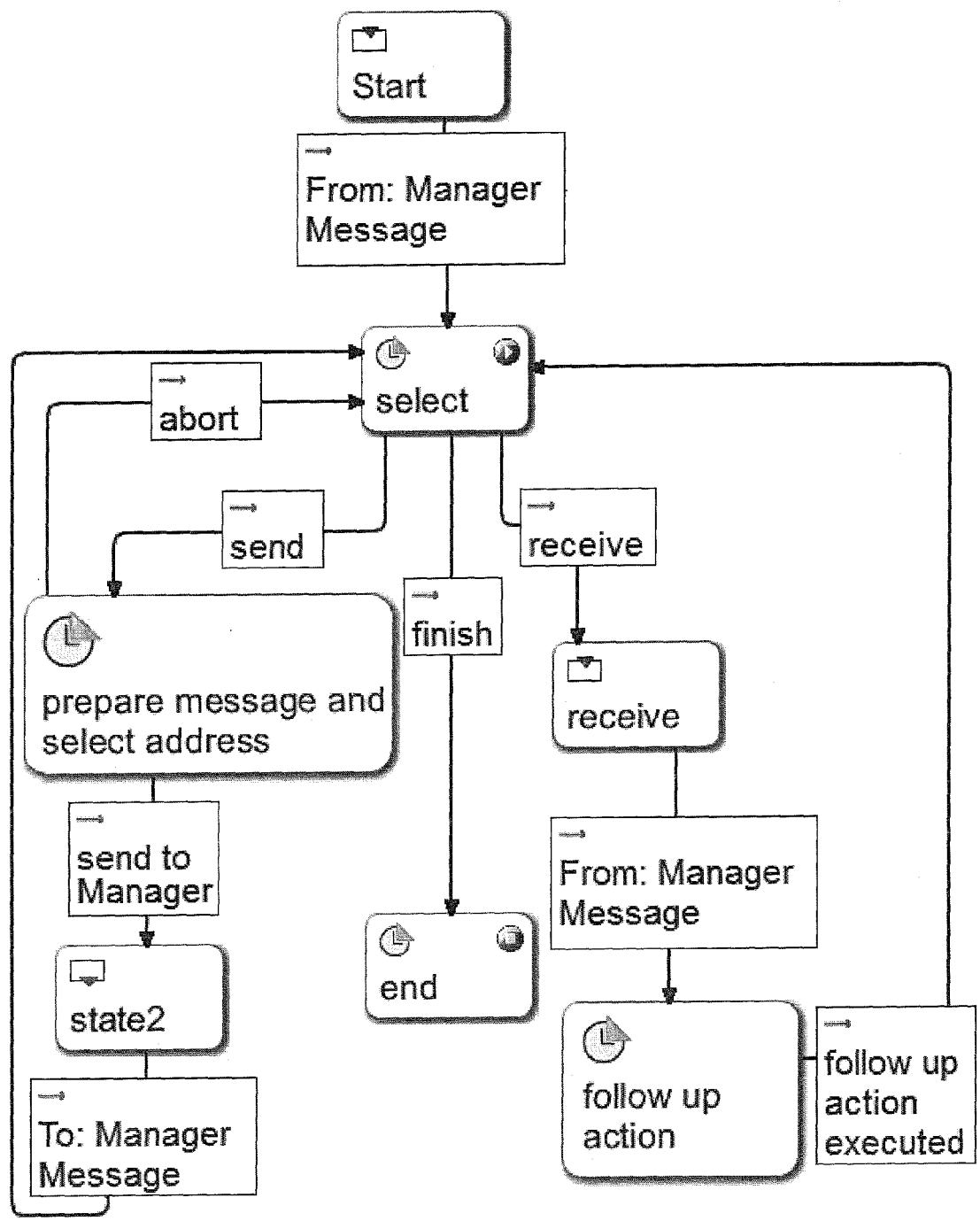
Figure 18:
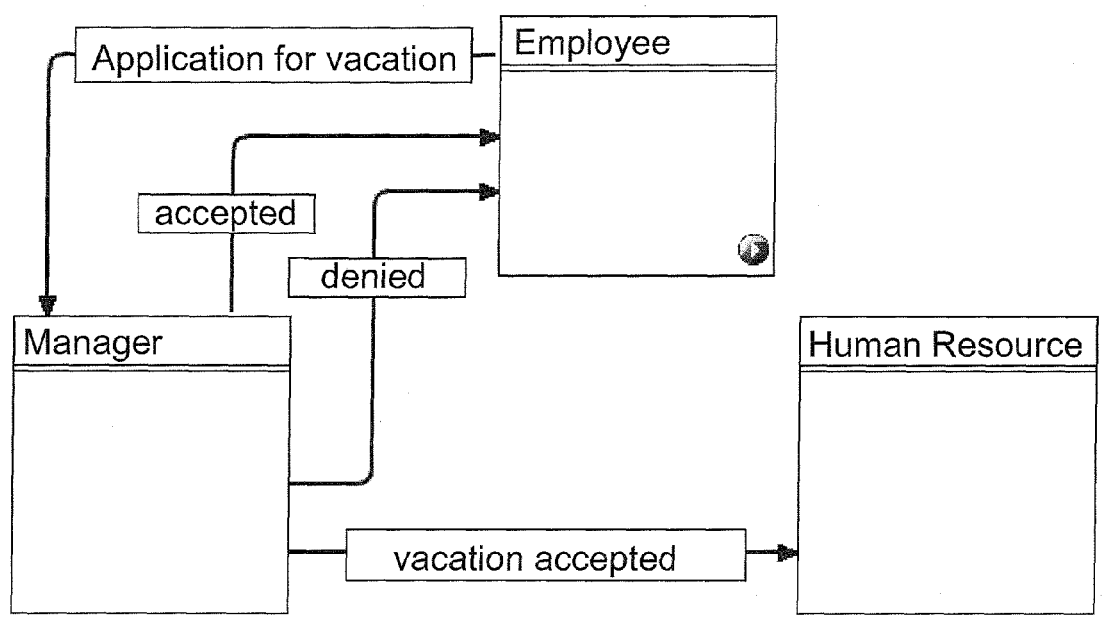

This change is shown in the process transition diagram of the subject "employee", which was originally subject 1 (FIG. 17). As source or receiver, meaningful names are entered in each case. Correspondingly, these meaningful names are also entered in the commands of the subjects in the process description.

The individual messages may be processed. In this connection, meaningful names are assigned especially to the individual messages. The message from subject "employee" to subject "manager" is described as "application for vacation".

The structure of this message has been modified by the user (FIG. 23), and now contains the fields "First_Name", "Second_Name", "Vacation_Start", "Vacation_End" and "Vacation_Status". The fields "Vacation_Start" and "Vacation_End" are dates. The other fields are strings. This message is to be filled out by the employee concerned according to his vacation wishes and sent to his superior, which is simulated by the subject "manager". The message from "manager" to "employee" is split into two messages, designated as "accepted" and "denied" respectively. These messages have the same content as the message "Vacation_Application", with only their designation reading "accepted" or "denied".

The message from the subject "manager" to the subject "human resources" is renamed as "vacation accepted". The content of the message is the same as that of the message "application for vacation". This message has only one other designation.

Figure 19:
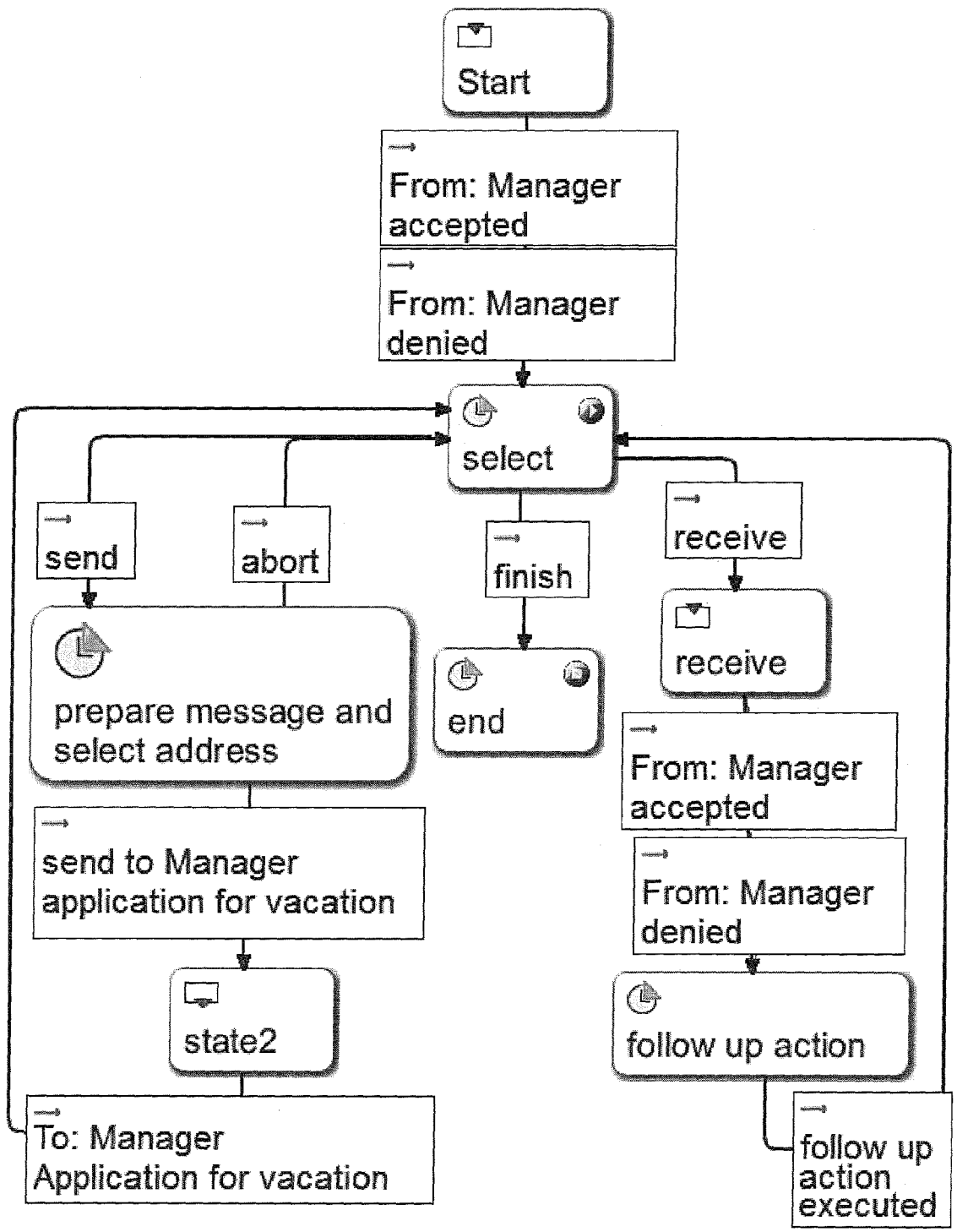
Figure 20:
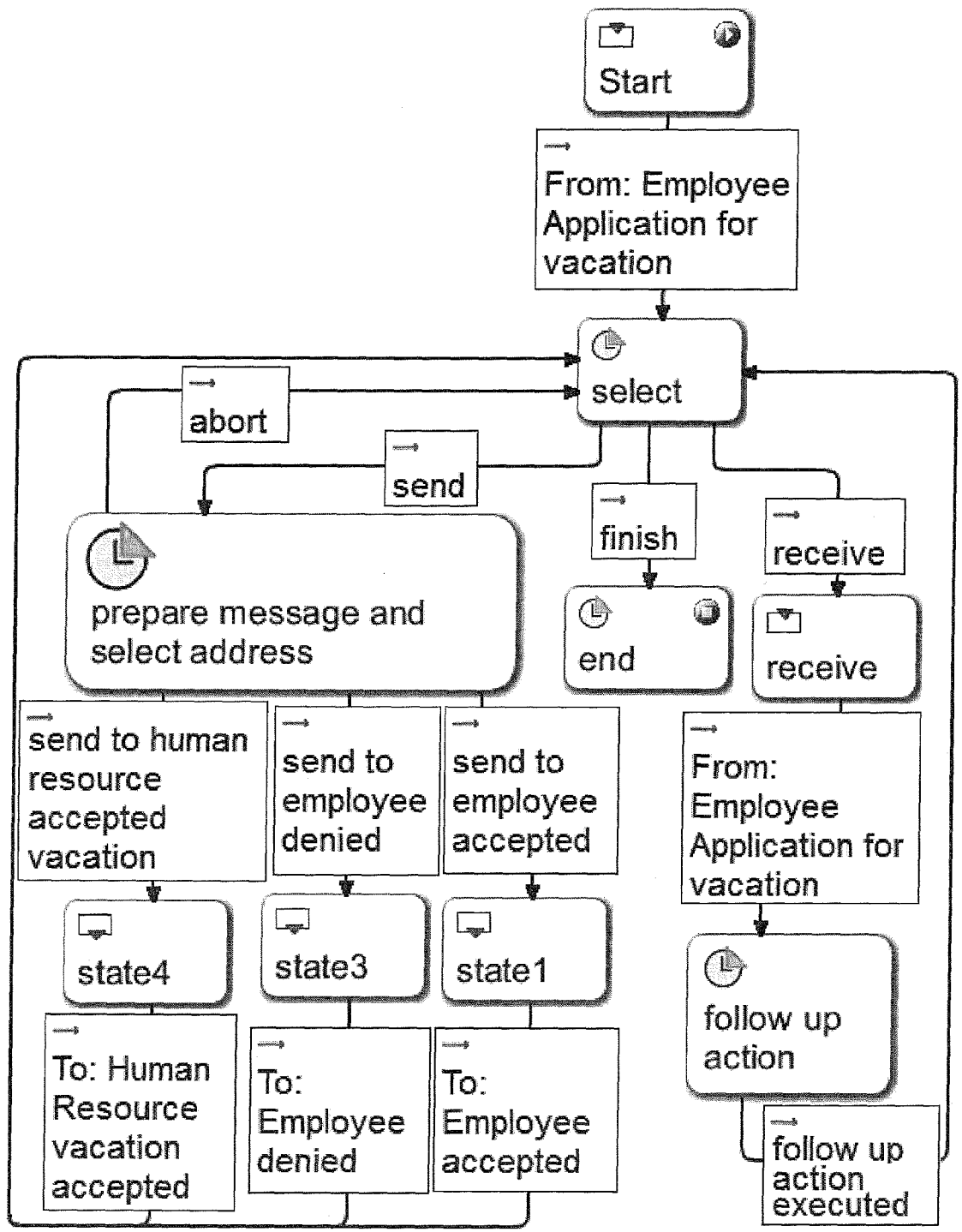
Figure 21:
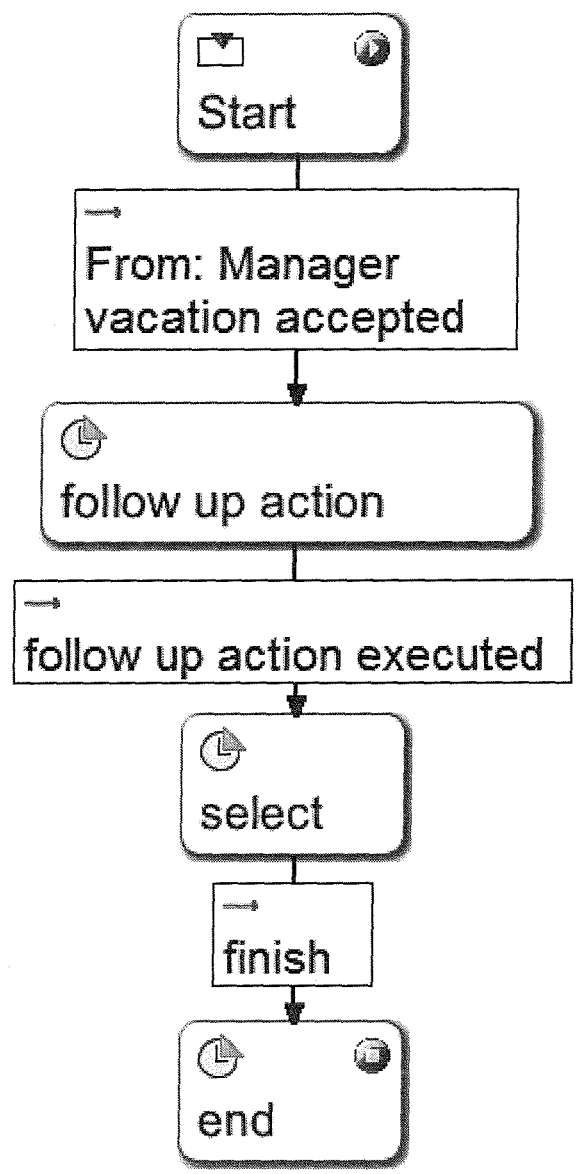

The change in the messages results in the behaviour for the subject "employee" shown with the aid of a transition diagram in FIG. 19, the behaviour for the subject "manager" shown with the aid of a transition diagram in FIG. 20, and the behaviour for the subject "human resources" shown with the aid of a transition diagram in FIG. 21.

With the aid of FIG. 20 one can see that the subject "manager" is able to send three messages, and specifically to the subject "employee" a message "denied" or a message "accepted", and to the subject "human resources" a message "vacation accepted". These three messages are initially arranged next to one another in the state transition diagram on an entirely equal basis.

With the subject manager, the subject "manager" may be made even more precise. In the present embodiment, a command for a decision is inserted, so that the subject "manager" has to decide whether or not it grants the vacation request. By this means the process is branched, with the rejection message "denied" being sent to the subject "employee" in one branch, while in the other branch first the approval message "accepted" is sent to the subject "employee", and then the message that an "application for vacation" has been accepted (message:"accepted vacation application" is sent to the subject "human resources2.

FIG. 22 shows the state transition diagram after insertion of the decision in the subject "manager" by means of the subject manager. To make this decision during the simulation, either at a specific point in the computer network a user may be asked by a suitable input prompt how to decide in the specific case, or the decision may also be made automatically with the aid of predetermined parameters, corresponding to the rules applicable in the company. If the company for example already has defined rules, such as for example that certain employees may not take vacation at the same time, that no vacation may be taken on certain days or in certain weeks, that the vacation should be for a certain minimum period of time or may not exceed a predetermined maximum period of time, then it is also possible to check automatically whether or not the vacation application complies with these requirements. If these requirements are already defined in a computer program, then they may be integrated into a subject as a refinement. For this purpose, various interfaces (e.g. ASCII text) are available and may be made use of by the user to link the refinement to the process. With these interfaces, data may be passed over to the refinement, and taken over from the refinement. If this decision is not defined in detail by rules or made more precise by a refinement then, on insertion of a decision, an input prompt to the user will be generated which, in executing the process, retrieves the relevant input for the decision.

The process generator is so designed that the user of the system is able to make changes and additions to the process diagram or to individual subjects only in the process manager, the workflow manager and the subject manager. The user writes no computer code whatsoever. At the end of modelling the process with the aid of the process diagram, storage takes place, in which a process description in the meta language is stored in a process file.

This process description in the meta language is converted automatically by the source code generator into a source code. This source code may be either executed directly by means of an interpreter, or converted by a computer into an executable machine code.

If an interpreter is used, the source code generator may also be integrated in the process generator with the process description in the meta language being made sufficiently precise for the interpreter that it may be executed directly by the interpreter. However, the embodiment with a separate source code generator is preferred, with preferably a separate source code being generated for each cluster. By this means, different clusters may be brought to execution on different computers, with the computers being interlinked through a data network, so that subjects of the different clusters may exchange messages with one another.

Preferably a separate process file is also generated for each cluster. The process file contains a name which is derived from the name of the cluster. The process file may also contain details of the computer to which the cluster should be brought for execution, with a static or dynamic IP address, where applicable the IP address of a server, optional details such as the name of the developer and the version. It may also be expedient to provide internal and external subjects, with internal subjects being able to communicate only with other subjects within the cluster, and external subjects being able to communicate with other external subjects of other clusters. The external subjects may therefore contain commands for the external exchange of messages, i.e. beyond the boundaries of the cluster. Naturally the external subjects may also communicate with the internal subjects of their own cluster.

A process may therefore be generated in a modular fashion from many clusters. Individual clusters may also simply be exchanged within a process. With the process manager, the exchange of messages between the subjects of different clusters may be specified. In this way, different clusters are linked with one another. With the system according to the invention and the method according to the invention, the individual clusters may be generated very quickly, easily and reliably, wherein firstly an essentially complete universal process of a cluster with a predetermined number of subjects is generated automatically, and is then made more precise by reducing the number of messages and if applicable limiting the sources, the message content, the volume of data or the like. It is also possible to provide, for the receipt of messages by subjects, input buffers, also known as input pools, as are already known from U.S. Pat. No. 7,861,221. These input pools or input buffers may have an adjustable receiving capacity. The default value is generally 1000 messages. Moreover, additional input pool restrictions may also be specified, such a for example that predetermined receiving capacity is reserved for certain senders and/or certain message types. In this way, a separate receiving capacity is reserved in the input pool for each sender and/or each message type. These receiving capacities thus form sections of the input pool which are independent of one another. By this means it is ensured that a certain sender is not able to fill up the input pool completely on their own, but that for certain senders and/or certain message types a predetermined section is available independently of the volume of messages from other senders.

The receiving of messages is executed by means of non-active waiting for the relevant message. Non-active waiting is based on the so-called monitor concept, which has already been described in October 1974 by Hoare, C. A. R. in the article "Monitors: An operating system structuring concept" in Commun. ACM 17, 10. In a simplified manner, this monitor concept may be described as a shift of the waiting function from a program level into the operating system level or process level. It is important that this monitor system prevents a multiplicity of tasks from being active simultaneously in a multitasking system, and repeatedly demanding process capacity to execute the waiting. Through the monitor concept, the waiting element of a multiplicity of tasks is monitored only by a single operating system task. This monitoring concept provides a simple means of ensuring that a multiplicity of programs and/or tasks may run in parallel alongside one another, and may wait for data from another task or program, without this causing significant impairment of processor power. In JAVA, the monitor concept is implemented by the methods "notify", "notify all" and "wait".

In the present invention, as in U.S. Pat. No. 7,861,221, the source code is generated from the process file. However, the present invention differs from this known method in that a separate source code is not generated for each subject, but instead in each case a separate source code is generated for each cluster, comprising one or more subjects. Preferably a JAVA® class is created for each cluster. This JAVA® class inherits methods of a pre-programmed standard class, which is supplemented by a range of methods. A corresponding source code file is initialised, i.e. a method of initialising the class is written in the source code. This method is described in JAVA® as a constructor. The process file name and a cluster ID are entered in this constructor. In the source code, a JAVA® method "main" is entered. In this main method is a call from a run method, which has been inherited from a pre-programmed standard class. Optionally, method calls for refinement functions may also be entered in the source code.

This source code may then either be interpreted by an interpreter or compiled by a compiler.

LIST OF REFERENCE NUMBERS 1 computer system
2 input device
3 output device
4 JAVA platform
5 source code generator
6 process generator
7 source code
8 process manager
9 subject manager
10 subject
11 message
12 box
13 header
14 start triangle

The invention claimed is:

1. A system for generating source code for a computer program that executes or simulates a process in which several subjects communicate with one another, the system comprising a computer system with one or more input devices, an output device, memory, a processor, a process generator, and a source code generator, wherein:

the process generator is a module stored in the memory, executable by the processor, and initiated by user input from the one or more input devices;
the source code generator is a module stored in the memory and executable by the processor;
the process generator, when initiated by user input, automatically generates a process file and a universal process, the process file being a module in the memory, the universal process being graphically displayed on the output device as a process diagram, the universal process including one or more clusters, each cluster having a predetermined number of subjects having two messages between each of the subjects within a single cluster, wherein each of the subjects contains commands comprising commands for the sending and receiving of the messages, wherein each of the subjects sends one of the two messages, and wherein each of the subjects receives one of the two messages;
the process generator includes a process manager that comprises a graphical user interface that displays the process diagram on the output device and allows a user to modify the universal process through user input from the one or more input devices in order to create a special process by deleting individual messages between each of the subjects within a single cluster and by creating messages between a subject of a specific cluster and a subject which is not part of the specific cluster;
the process manager stores the special process in the process file, wherein the special process is converted automatically into a meta language; and
the source code generator automatically generates source code for the computer program from the special process stored in the process file.

2. The system according to claim 1, wherein the process manager allows user input to modify the universal process by allowing a user to:
  i) change the name of individual messages and the name of subjects, wherein the process manager automatically enters the changed name of the message and the changed name of the subjects into the commands of the subjects,
  ii) determine which subject is the first to send a message, and
  iii) determine a sequence of sending the messages and to what subject or subjects the messages are sent to thereby generate a message flow.

3. The system according to claim 2, wherein the process generator includes a subject manager, the subject manager comprising a graphical user interface that displays the subjects and the commands on the output device, wherein the subject manager allows for user input to modify the universal process by allowing the user to change the behavior of the subjects.

4. The system according to claim 3, wherein:
the subject manager allows the user to restrict the content of a message to be received;
the subject manager allows the user to restrict the number of messages a subject is able to receive;
the subject manager allows the user to specify that a subject repeat a command;
the subject manager allows the user to change or add to the commands of a subject;
the subject manager outputs data to the output device;
the subject manager executes a decision dependent on predetermined parameters; and
the subject manager terminates the sequence of sending the individual messages.

5. The system according to claim 4, wherein the process generator includes a workflow manager that comprises a user interface and assists the user in creating the special process by guiding the user along consecutive states of the individual subjects, so that the user may change behavior of the subjects through input from the one or more input devices.

6. The system according to claim 1, wherein the process generator includes a subject manager, the subject manager comprising a graphical user interface that displays the subjects and the commands on the output device, wherein the subject manager allows for user input to modify the universal process by allowing the user to change the behavior of the subjects.

7. The system according to claim 6, wherein:
the subject manager allows the user to restrict the content of a message to be received;
the subject manager allows the user to restrict the number of messages a subject is able to receive;
the subject manager allows the user to specify that a subject repeat a command;
the subject manager allows the user to change or add to the commands of a subject;
the subject manager outputs data to the output device;
the subject manager executes a decision dependent on predetermined parameters; and
the subject manager terminates the sequence of sending the individual messages.

8. The system according to claim 1, wherein the process generator includes a workflow manager that comprises a user interface and assists the user in creating the special process by guiding the user along consecutive states of the individual subjects, so that the user may change behavior of the subjects through input from the one or more input devices.

9. A method for generating source code for a computer program that executes or simulates a process in which several subjects communicate with one another, the method comprising:
providing a computer system comprising one or more input devices, an output device, memory, a processor, a process generator, and a source code generator, wherein the process generator and the source code generator are modules saved in the memory and executable by the processor;
initiating the process generator by user input from the one or more input devices, wherein the process generator automatically generates a universal process and one or more process files, the one or more process files being modules in the memory, the universal process being graphically displayed as a process diagram on the output device and comprising one or more clusters, each cluster having a predetermined number of subjects having two messages between each of the subjects within a single cluster, each of the subjects containing commands for the exchange of messages between the subjects, each of the subjects sending one of the two messages, and each of the subjects receiving one of the two messages;
modifying the universal process, to thereby create a special process, by deleting individual messages of the automatically generated messages through user input from the one or more input devices, and by generating individual messages between one of the subjects of a specific cluster and a subject which is not part of the specific cluster through user input from the one or more input devices; and
storing the special process in a process file, wherein the source code generator automatically generates source code from the special process stored in the process file.

10. The method according to claim 9, wherein separate source code is generated by the source code generator for each of the one or more clusters and is stored in separate process files.

11. The method according to claim 9, wherein:
the process generator includes a process manager comprising a graphical user interface that displays the process diagram on the output device;
the process manager allows user input to modify the universal process by allowing a user to i) change the name of individual messages and the name of subjects, wherein the process manager automatically enters the changed name of the message and the changed name of the subjects into the commands of the subjects, ii) determine which subject is the first to send a message, and iii) determine a sequence of sending the messages and to what subject or subjects the messages are sent to thereby generate a message flow; and
the process manager automatically converts the special process into a meta language and stores the special process in the process file.

12. The method according to claim 9, wherein:
the process generator includes a subject manager comprising a graphical user interface that displays the subjects and the commands on the output device;
the subject manager allows for modifying the universal process by allowing user input to change the behavior of the subjects through i) restricting the content of a message to be received, ii) restricting the number of messages a subject is able to receive, iii) specifying that a subject repeat a command, and iv) modifying the commands of a subject; and
the subject manager outputs data to the output device, executes a decision dependent on predetermined parameters, and terminates the sequence of sending the individual messages.

13. The method according to claim 9, wherein the process generator includes a workflow manager comprising a user interface that assists a user in creating the special process by guiding the user along consecutive states of the individual subjects, so that the user may change behavior of the subject through input from the one or more input devices.

14. A method for generating source code for a computer program that executes or simulates a process in which several subjects communicate with one another, the method comprising:
providing a computer system comprising one or more input devices, an output device, memory, a processor, a process generator, and a source code generator, wherein the process generator and the source code generator are modules saved in the memory and executable by the processor;
initiating the process generator by user input from the one or more input devices, wherein the process generator automatically generates a universal process and at least two process files, the process files being modules in the memory, the universal process being graphically displayed as a process diagram on the output device and comprising at least two clusters, each cluster having a predetermined number of subjects having two messages between each of the subjects within a single cluster, each of the subjects containing commands for the exchange of messages between the subjects within a single cluster, each of the subjects sending one of the two messages, and each of the subjects receiving one of the two messages;

modifying the universal process, to thereby create at least two special processes, by deleting individual messages of the automatically generated messages through user input from the one or more input devices, by modifying names and structures of the messages, and by generating individual messages between one of the subjects of a specific cluster and a subject which is not part of the specific cluster through user input from the one or more input devices, wherein each of the special processes comprises a single cluster having a predetermined number of subjects; and storing each of the special processes in separate process files, wherein the source code generator automatically generates separate source code from each of the special processes stored in the process file.

* * * * *